United States Patent
Pishdad

(10) Patent No.: US 10,571,945 B2
(45) Date of Patent: Feb. 25, 2020

(54) LOW POWER REGULATOR CIRCUITS, SYSTEMS AND METHODS REGARDING THE SAME

(71) Applicant: Atlazo, Inc., La Jolla, CA (US)

(72) Inventor: Bardia Pishdad, San Diego, CA (US)

(73) Assignee: Atlazo, Inc., La Jolla, CA (US)

( * ) Notice: Subject to any disclaimer, the term of this patent is extended or adjusted under 35 U.S.C. 154(b) by 0 days.

(21) Appl. No.: 16/281,021

(22) Filed: Feb. 20, 2019

(65) Prior Publication Data

US 2019/0258283 A1    Aug. 22, 2019

Related U.S. Application Data

(60) Provisional application No. 62/633,535, filed on Feb. 21, 2018.

(51) Int. Cl.
| | |
|---|---|
| *G05F 1/575* | (2006.01) |
| *G06F 1/3203* | (2019.01) |
| *G05F 3/26* | (2006.01) |

(52) U.S. Cl.
CPC .............. *G05F 1/575* (2013.01); *G05F 3/262* (2013.01); *G06F 1/3203* (2013.01)

(58) Field of Classification Search
CPC ... G05F 1/46; G05F 1/56; G05F 1/575; G05F 3/362; G06F 1/3202
See application file for complete search history.

(56) References Cited

U.S. PATENT DOCUMENTS

| | | | |
|---|---|---|---|
| 5,481,178 A | 1/1996 | Wilcox | |
| 6,636,022 B2 | 10/2003 | Sluijs | |
| 7,174,523 B2 | 2/2007 | Engel et al. | |
| 7,487,474 B2 | 2/2009 | Ciplickas | |
| 7,552,409 B2 | 6/2009 | Kucukcakar | |
| 7,913,071 B2 | 3/2011 | Mallik et al. | |
| 8,051,398 B2 | 11/2011 | Bittlestone | |
| 8,169,203 B1 * | 5/2012 | Vemula .................. | G05F 1/575 323/273 |
| 8,307,317 B2 | 11/2012 | Adams | |
| 8,464,199 B1 | 6/2013 | Charlebois et al. | |
| 8,543,966 B2 | 9/2013 | Bickford | |
| 9,317,048 B2 | 4/2016 | Kuang | |
| 9,408,266 B2 | 8/2016 | Logiudice | |

(Continued)

FOREIGN PATENT DOCUMENTS

| | | |
|---|---|---|
| JP | 2014064436 A1 | 4/2014 |
| WO | 0911483 A1 | 3/1998 |

OTHER PUBLICATIONS

Qian, J. et al. (Dec. 2009). Single-inductor Dual-output DC/DC Buck converter With High full-load Efficiency. 10.1109/EDSSC.2009.5394235. (3 pages).

(Continued)

*Primary Examiner* — Adolf D Berhane

(74) *Attorney, Agent, or Firm* — Perkins Coie LLP

(57) ABSTRACT

Disclosed are low power (e.g., nanowatt) voltage regulator circuits and devices, systems and methods using the same for ultra-low power applications, such as, but not limited to, Internet of things (IoT) applications. The disclosed devices and systems relate to low-dropout (LDO) circuits and methods for constructing and using the same. The disclosed LDOs operate with uniform output frequency characteristics over a wide range of load currents.

28 Claims, 12 Drawing Sheets

(56) References Cited

U.S. PATENT DOCUMENTS

| | | | |
|---|---|---|---|
| 9,915,963 B1* | 3/2018 | Wu | G05F 1/575 |
| 10,222,852 B2 | 3/2019 | Foreman | |
| 10,236,763 B2 | 3/2019 | Hu | |
| 10,416,746 B2 | 9/2019 | Solki | |
| 2005/0184711 A1* | 8/2005 | Chen | G05F 1/575 323/280 |
| 2006/0114017 A1 | 6/2006 | El-kik | |
| 2007/0018712 A1 | 1/2007 | Gk | |
| 2007/0089078 A1 | 4/2007 | Engel | |
| 2008/0122291 A1 | 5/2008 | Uchimoto | |
| 2009/0037854 A1 | 2/2009 | Bittlestone | |
| 2009/0284240 A1 | 11/2009 | Zhang | |
| 2010/0052635 A1* | 3/2010 | Wang | G05F 1/575 323/280 |
| 2010/0194434 A1 | 8/2010 | Tran Vo | |
| 2010/0327952 A1 | 12/2010 | Wu | |
| 2011/0248764 A1 | 10/2011 | Das | |
| 2011/0267017 A1* | 11/2011 | Zhang | G05F 1/575 323/280 |
| 2012/0124538 A1 | 5/2012 | Lackey | |
| 2012/0159216 A1 | 6/2012 | Wells | |
| 2013/0069608 A1* | 3/2013 | Gakhar | G05F 1/575 323/273 |
| 2013/0099764 A1* | 4/2013 | Zhang | G05F 1/575 323/273 |
| 2013/0271100 A1* | 10/2013 | El-Nozahi | G05F 1/468 323/280 |
| 2014/0152344 A1 | 6/2014 | Chiou | |
| 2014/0225579 A1 | 8/2014 | Dally | |
| 2014/0232360 A1 | 8/2014 | Dally | |
| 2015/0198960 A1* | 7/2015 | Zhang | G05F 1/56 323/280 |
| 2015/0214841 A1 | 7/2015 | Ramorini et al. | |
| 2016/0077537 A1* | 3/2016 | Enjalbert | G05F 1/575 323/280 |
| 2016/0118894 A1 | 4/2016 | Zhang | |
| 2016/0164497 A1 | 6/2016 | Agarwal | |
| 2016/0334818 A1* | 11/2016 | Singh | G05F 1/56 |
| 2016/0359421 A1 | 12/2016 | Lin | |
| 2017/0033698 A1 | 2/2017 | Vemuri | |
| 2017/0093350 A1* | 3/2017 | Ramos | H03F 3/45475 |
| 2017/0115678 A1* | 4/2017 | Qing | G05F 1/575 |
| 2017/0160757 A1* | 6/2017 | Yang | G05F 1/575 |
| 2017/0272073 A1 | 9/2017 | Betz | |
| 2018/0120879 A1* | 5/2018 | Du | G05F 1/575 |
| 2018/0173258 A1* | 6/2018 | Singh | G05F 1/575 |
| 2018/0284829 A1* | 10/2018 | Hussien | G05F 1/63 |
| 2018/0321092 A1 | 11/2018 | Jones | |
| 2019/0212799 A1 | 7/2019 | Solki | |
| 2019/0213292 A1 | 7/2019 | Solki | |
| 2019/0214906 A1 | 7/2019 | Mahmoudi | |
| 2019/0235566 A1 | 8/2019 | Ensafdaran | |
| 2019/0280593 A1 | 9/2019 | Hedayati | |

OTHER PUBLICATIONS

Tao, C. et al. (Nov. 2011). A Buck Converter With Reduced Output Spurs Using Asynchronous Frequency Hopping. IEEE Transactions on Circuits and Systems—II: Express Briefs, vol. 58, No. 11, p. 709-713. (5 pages).

Ko, Y. et al. (Jun. 2014) Load-Balance-Independent High Efficiency Single-Inductor Multiple-Output (SIMO) DC-DC Converters. Journal of Semiconductor Technology and Science, vol. 14, No. 3., p. 300-312. (13 pages).

Harris, David M. Det al., "A transregional model for near-threshold circuits with application to minimum-energy operation," in Proc. 2010 Int. Conf. Microelectronics (ICM), Cairo, Egypt, Dec. 19-22, 2010, pp. 64-67.

S. Kosonocky et al., "Designing in Scaled Technologies: 32nm and Beyond," presented at 2012 Symposia on VLSI Technology and Circuits, Honolulu, HI, Jun. 2012.

Jungseob Lee et al., "Improving Throughput of Power-Constrained GPUs Using Dynamic Voltage/Frequency and Core Scaling," in Proc. 2011 Int. Conf. Parallel Architectures and Compilation Techniques (PACT), Galveston, TX, Oct. 10-14, 2011, pp. 111-120.

Massimo Alioto, "Ultra-Low Power VLSI Circuit Design Demystified and Explained: A Tutorial," IEEE Trans. Circuits Syst. I, Reg. Papers, vol. 59, pp. 3-29, Jan. 2012.

Alice Wang, et al., "Optimal supply and threshold scaling for subthreshold CMOS circuits," in Proc. 2002 IEEE Computer Society Annu. Symp. VLSI, Pittsburg, PA, Apr. 25-26, 2002, pp. 5-9.

Bo Zhai et al., "Energy-Efficient Subthreshold Processor Design," IEEE Trans. Very Large Scale Integr. (VLSI) Syst., vol. 17, pp. 1127-1137, Aug. 2009.

Y. Pu et al., "Misleading energy and performance claims in sub/near threshold digital systems," in Proc. 2010 IEEE/ACM Int. Conf. Computer-Aided Design (ICCAD), San Jose, CA, Nov. 7-11, 2010, pp. 625-631.

D. Bol et al., "Interests and Limitations of Technology Scaling for Subthreshold Logic," IEEE Trans. Very Large Scale Integr. (VLSI) Syst., vol. 17, pp. 1508-1519, Oct. 2009.

S. Jain et al., "A 280mV-to-1.2V wide-operating-range IA-32 processor in 32nm CMOS," in Digest of Technical Papers 2012 IEEE Int. Solid-State Circuits Conf. (ISSCC), San Francisco, CA, Feb. 19-23, 2012, pp. 66-68.

D. Wolpert and P. Ampadu, "Exploiting Programmable Temperature Compensation Devices to Manage Temperature-Induced Delay Uncertainty," IEEE Trans. Circuits and Syst. I: Reg. Papers, vol. 59, pp. 735-748, Apr. 2012.

BSIM4.3.0 MOSFET Model—User's Manual, Department of Electrical Engineering and Computer Sciences, University of California, Berkeley, CA, 2003.

M. Faisal, N. E. Roberts and D. D. Wentzloff, "A 300nW near-threshold 187.5-500 kHz programmable clock generator for ultra low power SoCs," 2015 IEEE SOI-3D-Subthreshold Microelectronics Technology Unified Conference (S3S), Rohnert Park, CA, 2015, pp. 1-3.

M. Huang and C. Hung, "Full-custom all-digital phase locked loop for clock generation," VLSI Design, Automation and Test(VLSI-DAT), Hsinchu, 2015, pp. 1-4.

J. Liu et al., "A 0.8V, sub-mW, varactor-tuning ring-oscillator-based clock generator in 32nm CMOS," IEEE Asian Solid-State Circuits Conference 2011, Jeju, 2011, pp. 337-340.

A. Tajalli and Y. Leblebici, "A 9 pW/Hz adjustable clock generator with 3-decade tuning range for dynamic power management in subthreshold SCL systems," 2010 Proceedings of ESSCIRC, Seville, 2010, pp. 242-245.

X. Zhang and A. B. Apsel, "A Low-Power, Process-and-Temperature-Compensated Ring Oscillator With Addition-Based Current Source," in IEEE Transactions on Circuits and Systems I: Regular Papers, vol. 58, No. 5, pp. 868-878, May 2011.

Man et al, "A High Slew-Rate Push-Pull Output Amplifier for Low-Quiescent Current Low-Dropout Regulators With Transient-Response Improvement", IEEE Transactions on Circuits and Systems II: Express Briefs, 2007.

Y. Lu, et al., "A 0.65ns-Response-Time 3.01ps FOM Fully-Integrated Low-Dropout Regulator with Full-Spectrum Power-Supply-Rejection for Wideband Communication Systems", IEEE ISSCC, pp. 306-307, Feb. 2014.

Chen, Y. et. al, "An Ultra-low Quiescent Current Output Capacitor-less Low-Dropout Regulator with a Novel Slew-rate-enhanced Circuit", 2014 IEEE International Symposium on Radio-Frequency Integration Technology.

X. Ming, et al, "A Low-Power Ultra-Fast Capacitor-Less LDO With Advanced Dynamic Push-Pull Techniques", International Conference on VLSI and System-on-Chip, pp. 54-59, 2011.

Liu et al, "An Ultra-Low Power Voltage Regulator for RFID Application", Chia-Chin, Chunhong Chen, 2013 IEEE 56th International Midwest Symposium on Circuits and Systems (MWSCAS).

Liu et al, "A 90nA quiescent current 1.5V-5V 50mA asynchronous folding LDO using dual loop control", 2016 IEEE Asian Solid-State Circuits Conference (A-SSCC).

Mazumdar et al, "A Digitally-Controlled Power-Aware Low-Dropout Regulator to Reduce Standby Current Drain in Ultra-Low-Power MCU", 2015 International Symposium on Quality Electronic Design.

(56) References Cited

OTHER PUBLICATIONS

Liang et al, "A 802 nA Quiescent Current and 100 mA Load Low-Dropout Regulator for Micro Energy Harvest System", 2018 2018 13th IEEE Conference on Industrial Electronics and Applications (ICIEA).
Rikan et. al, "A low leakage retention LDO and leakage-based BGR with 120nA quiescent current", 2017 International 3oC Design Conference (ISOCC).
Chien-Yi Wu et al, "An ultra-low power capacitor-less LDO for always-on domain in Nb-IoT applications", 2018 IEEE International Conference on Applied System Invention (ICASI).
Solki, Shahin et al. U.S. Appl. No. 16/242,405 Non-Final Office Action dated Mar. 29, 2019.
Solki, Shahin et al. U.S. Appl. No. 16/244,509 Non-Final Office Action dated Mar. 28, 2019.
International Application No. PCT/US/2019/012414 International Search Report and Written Opinion dated May 8, 2019.
Solki, Shahin et al. U.S. Appl. No. 16/244,509 Notice of Allowance dated Jul. 17, 2019.
Hedayati, Hajir et al. U.S. Appl. No. 16/295,876 Non-Final Office Action dated Sep. 12, 2019.
Ensafdaran, Masoud et al. U.S. Appl. No. 16/265,648 Non-Final Office Action dated Aug. 9, 2019.
Solki, Shahin et al. U.S. Appl. No. 16/242,405 Non-final Office Action dated Sep. 25, 2019.
Mahmoudi, Farsheed, et al. U.S. Appl. No. 16/240,557 Non-Final Office Action dated Aug. 2, 2019.

\* cited by examiner

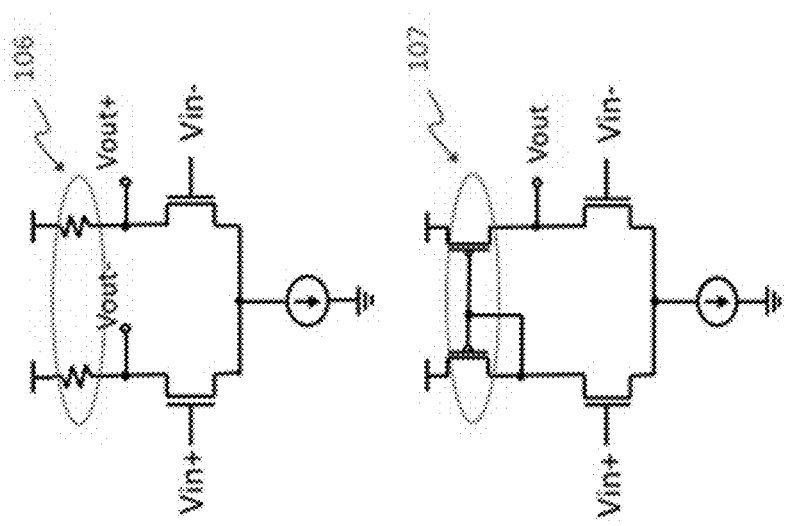
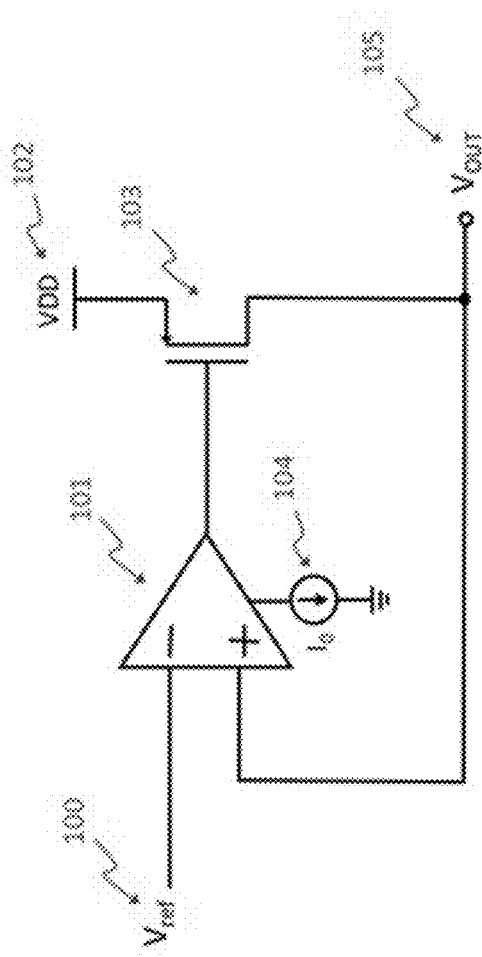
FIG. 2A
FIG. 2B

LOW POWER REGULATOR CIRCUITS, SYSTEMS AND METHODS REGARDING THE SAME

CROSS-REFERENCE TO RELATED APPLICATIONS

This patent document claims priority to and benefits of U.S. Provisional Patent Application No. 62/633,535 entitled "LOW POWER REGULATOR CIRCUITS, SYSTEMS AND METHODS REGARDING THE SAME" and filed on Feb. 21, 2018. The entire content of the before-mentioned patent application is incorporated by reference as part of the disclosure of this patent document.

TECHNICAL FIELD

This patent document relates to low power and compact circuits for data processing devices, systems and methods.

BACKGROUND

The Internet of things (IoT) is the network of physical devices that can include appliances, vehicles and other devices that have embedded electronics, software, and network connectivity to enable these physical devices to connect and exchange data. Each physical device of the IoT can be uniquely identifiable through its embedded computing system and is able to communicate with other devices using the existing infrastructure of the Internet. While not limited to IOT, the small form factor, ultra-low power consumption, and low-cost requirements make power consumption and physical footprint of the associated circuitry critically important in IoT applications since they directly impact the battery lifetime, cost and efficiency of such systems.

SUMMARY

Disclosed are low power (e.g., nanowatt) voltage regulator circuits and devices, systems and methods using the same for ultra-low power applications, such as, but not limited to, Internet of things (IoT) applications. The disclosed devices and systems relate to low-dropout (LDO) circuits and methods for constructing and using the same. The disclosed LDOs operate with uniform output frequency characteristics over a wide range of load currents.

BRIEF DESCRIPTION OF THE DRAWINGS

FIG. 2A shows a circuit diagram of a typical LDO topology with $V_{ref}$-$V_{LDO}$.

FIG. 2B shows circuit diagrams depicting various amplifier stage choices, including a passive-load amplifier stage (top) and active-load amplifier stage (bottom).

DETAILED DESCRIPTION

A low-dropout regulator (LDO) is a linear response circuit element that can regulate an output voltage in an electrical circuit, even when the supply voltage is very close to the output voltage. For example, LDOs are often included in electronic devices that require a low-noise power source instead of a switching regulator that might upset the system. Some advantages of LDOs include the absence of switching noise (as no switching takes place), smaller device size (as neither large inductors nor transformers are needed), and greater design simplicity.

LDOs use a feedback loop to maintain a constant output voltage. As with any feedback loop there is phase shift around the loop, which can be characterized as introducing one or more poles in the frequency domain behavior of the regulator. Depending on the number and locations of the poles, the stability and frequency behavior of the LDO can be affected. In various operations, the dominant pole of conventional LDOs is either placed at the output of the regulator (e.g., output-dominant topology) or at the output of the error amplifier in the feedback loop (e.g., amplifier-dominant topology). If no frequency compensation is used, there must be enough separation between the dominant pole and the other non-dominant poles to achieve good stability. These two prevalent design approaches are output-dominant topology and amplifier-dominant topology, summarized below.

Figure 1A:
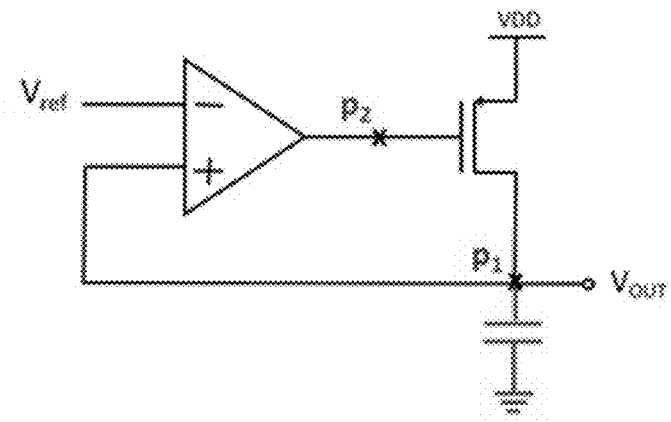
FIG. 1A shows a diagram depicting an example low-dropout regulator (LDO) having an output-dominant topology.

For an LDO having an output-dominant topology, the dominant pole is placed at the regulator output. To do so, a relatively large capacitor is placed at the regulator output, which pushes the output pole to low frequencies. The amplifier stage is then made to be fast, such that its output contributes a high-frequency pole. FIG. 1A shows a diagram depicting an example of an LDO having an output-dominant topology, showing a capacitor placed at the output of the regulator, which determines the location of the dominant pole ($p_1$), and the amplifier contributes to the location of non-dominant pole ($p_2$). Note that in FIG. 1, the marking x and designations $p_1$ and $p_2$ indicate the component output that contributes to the location of the corresponding pole.

Figure 1B:
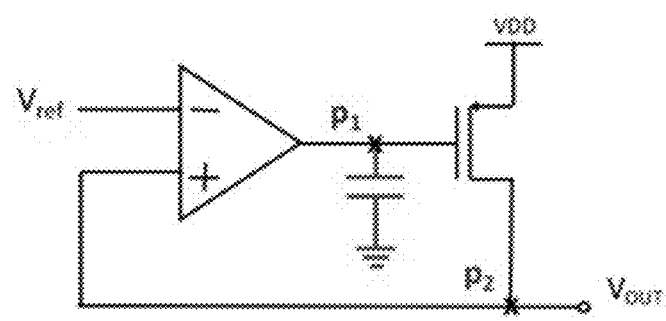
FIG. 1B shows a diagram depicting an example LDO having an amplifier-dominant topology.

For an LDO having an amplifier-dominant topology, the dominant pole is placed at the amplifier output. To do so, a relatively large capacitor is placed at the amplifier output (or a Miller capacitor between amplifier and regulator outputs), which pushes the amplifier pole to low frequency. The regulator is then designed such that its output node contributes a high-frequency pole. FIG. 1B shows a diagram depicting an example of an LDO having an amplifier-dominant topology, showing a capacitor placed at the output of the amplifier, which determines the location of the dominant pole ($p_1$), and the regulator output contributes to the non-dominant pole ($p_2$).

Figure 1C:
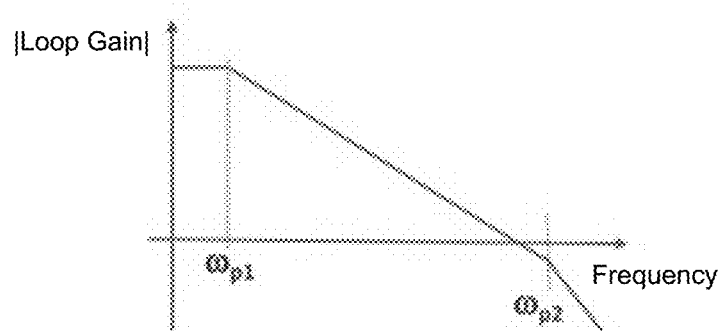
FIG. 1C shows a plot showing the desired frequency response for an output-dominant and an amplifier-dominant LDO.

FIG. 1C shows a plot showing the desired frequency response for an output-dominant or an amplifier-dominant LDO. As depicted in the plot, it is desirable to produce a large separation of the dominant pole (having frequency $\omega_{p1}$) and the non-dominant pole (having frequency $\omega_{p2}$), e.g., beyond the cross-over frequency.

FIG. 2A shows a circuit diagram of a typical LDO topology with $V_{ref} \sim V_{LDO}$. The circuit diagram of FIG. 2A shows the same conventional LDO configuration as depicted in FIGS. 1A and 1B, but without a particular capacitor placement in order to aid with the discussion below. The conventional LDO of FIG. 2A includes an error amplifier 101 connected to a reference voltage ($V_{ref}$) 100 at the negative polarity terminal and the output voltage ($V_{out}$) 105 of the LDO that is provided in a feedback loop to the positive polarity terminal. The output of the error amplifier 101 is coupled to a transistor 103, which is connected to $V_{DD}$ 102 (e.g., a voltage source). Also, the bias current, $I_0$, 104 in to the error amplifier 101 is shown, which constitutes the majority of the static current consumption for the cell. This consumption of power typically occurs as the LDO is idle, and is of little significance for conventional device applications. Yet, for ultra-low power applications, an LDO must be stable and robust by immediately responding to sudden surges of activity while regularly operating at extremely low currents. In ultra-low-power applications, this static current must be set to an absolute minimum, which brings about a number of consequences. Consequence 1: all the error amplifier gain must come from a single stage in order to minimize the static current. Passive (resistive) loads would be prohibitively large for the gain levels needed, so one must use active (transistor-based) loads to obtain high impedance (e.g., gain) at low area consumption. These gain stages 106 and 107 are shown in FIG. 2B for passive amplifier stage (top) and active amplifier stage (bottom), respectively. As a result, the amplifier pole can be computed as: $\frac{1}{2}\pi \cdot r_{amp} C_{amp}$, where $$r_{amp} = \frac{1}{\lambda \cdot I_{bias}}$$

is the output resistance of the amplifier, and $C_{amp}$ is the total parasitic capacitance connected to the amplifier's output, and $\lambda$ is the channel length modulation parameter, which is technology dependent. For bias currents in the order of 10's of nanoamps (nA), the amplifier pole is positioned at low frequencies (e.g., in the order of 1-10 kHz). The LDO's output pole is ($\frac{1}{2}\pi \cdot R_{out} \cdot C_{out}$) where $R_{out} = R_{outputFET} \| R_{load}$, where $R_{load}$ is the resistance looking in to the output load (see, e.g., FIG. 4), $R_{outputFET}$ is the output resistance of the output transistor, and $C_{out}$ is the total parasitic capacitance of the device and load. This pole frequency can also be quite low since $I_{load} \sim I_{bias}$, making $R_{outputFET}$ and $R_{load}$ both quite low, and $C_{out}$ is generally even larger than $C_{amp}$. Therefore, the ultra-low power operating conditions, results in nearly overlapping pole frequencies, making stability a difficult challenge.

Figure 3A:
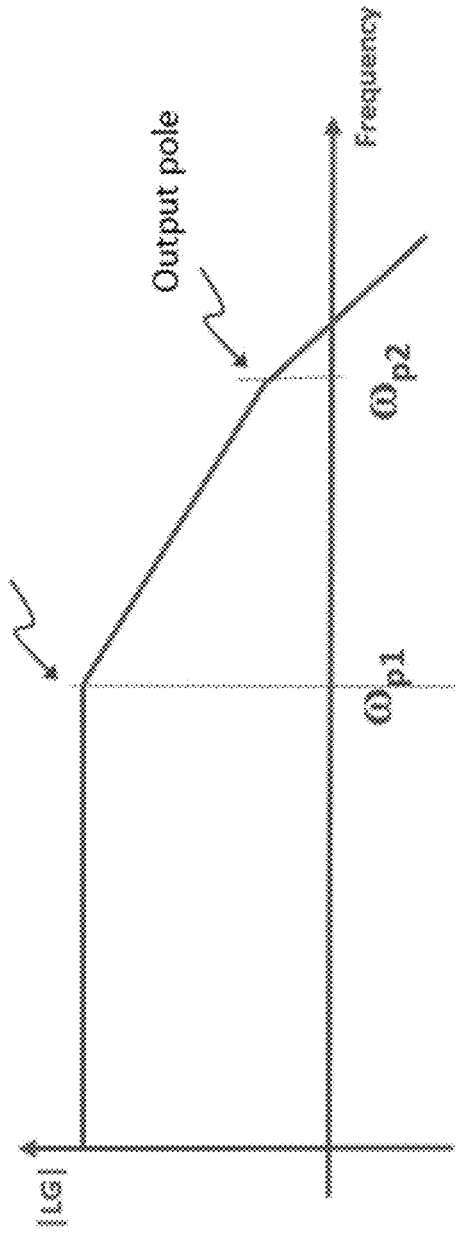
FIG. 3A shows an example frequency response plot of an LDO having an amplifier-dominant topology.
Figure 3B:
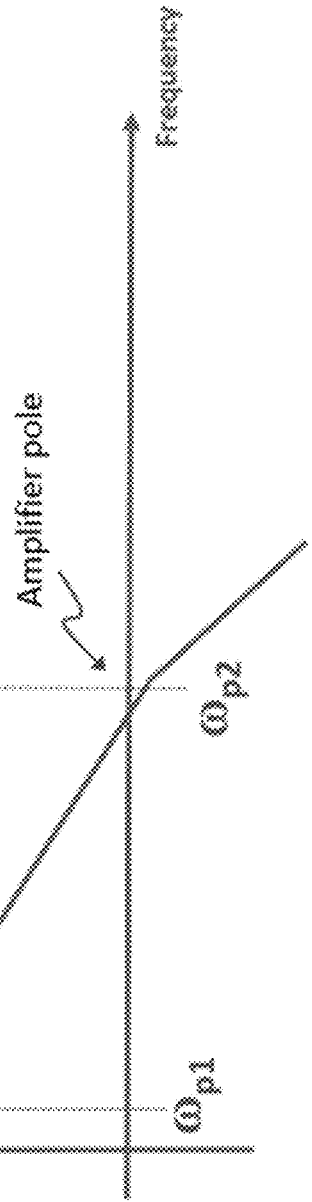
FIG. 3B shows an example frequency response plot of an LDO having an output-dominant topology.

Consequence 2: the choice of the dominant pole is not straightforward. FIGS. 3A and 3B show frequency response plots depicting the challenges of regulator dynamics in ultra-low power environments. Top plot in FIG. 3A shows a frequency response of an LDO having an amplifier-dominant topology, in which the non-dominant pole is placed too close to the dominant pole, causing the frequency response plot to quickly fall below the unity-gain frequency. Bottom plot in FIG. 3B shows a frequency response of an LDO having an output-dominant topology, in which the bandwidth is drastically low.

For example, if the amplifier output is chosen as the dominant pole, the output pole (non-dominant pole) must be placed as high in frequency as possible to guarantee enough separation between the two poles. However, due to the low levels of load current, the output node is also a high impedance node with a pole frequency $\omega_{p2}$ that is low enough to be below the unity-gain cross-over frequency. This is shown in the plot of FIG. 3A. It stands to reason to not add additional capacitors to this output node. The absence of any capacitance, however, means that in the event of a sudden large load transient, the regulated supply can droop significantly, and the error amplifier would be too slow to respond and correct in time, thereby prolonging the droop.

Another common practice is to add a Miller capacitor between the amplifier and the regulator output nodes to create a capacitor multiplication and a pole-splitting effect. While this is a very effective frequency compensation method, it introduces the problem of degraded power supply rejection (PSR), and is generally not a preferred option for LDO design.

If, on the other hand, the regulator output is chosen as the dominant pole, then it must be placed 2-3 decades (depending on the DC gain) lower than the amplifier pole, which is already at a very low frequency and does not move, as shown in the plot in FIG. 3(b). A large capacitor would be needed to achieve this, and the result would be an extremely low-bandwidth design.

In order to push out the non-dominant amplifier pole and create further separation, a common technique is to add a buffer stage between the amplifier and the output stages, isolating the amplifier from the large parasitic capacitance of the output stage. However, at very low currents, the buffer stage also contributes an in-band pole, thus resulting in two non-dominant poles (amplifier and buffer) with the net effect being a degradation in the stability profile.

Consequence 3: The slew rate at the output of the error amplifier ($I_{bias}/C_{out}$) is severely limited by the low bias current available. Regulation of small loads is adequate, but response to larger load transients is drastically slow.

These and other shortcomings of conventional LDOs are overcome by the disclosed nano-watt LDO circuits, devices, systems and methods.

As noted earlier, one non-exclusive application of the disclosed LDOs relates to IoT. Circuits proposed for IoT devices address some of the IoT requirements including wireless connectivity, data processors, storage, power management, and input/output (I/O) capability. However, the necessary small form factor, ultra-low energy consumption, and low cost are less addressed. Low energy consumption and higher energy efficiencies are critical in IoT applications since they directly impact the battery lifetime of the system. Therefore, circuits that can provide more energy efficiency, smaller size, and lower cost to central processing units are needed in order to supplement data processing in IoT devices, wearable devices, and other devices for portable device applications. The disclosed LDO structures are suitable for IoT applications, which demand ultra-low standby power consumption, with the ability to respond swiftly to sudden and large load transients. It is also understood that the disclosed embodiments can be implemented in other circuits used in no-IoT applications that can benefit from circuits with low power consumption and small footprints.

Figure 4:
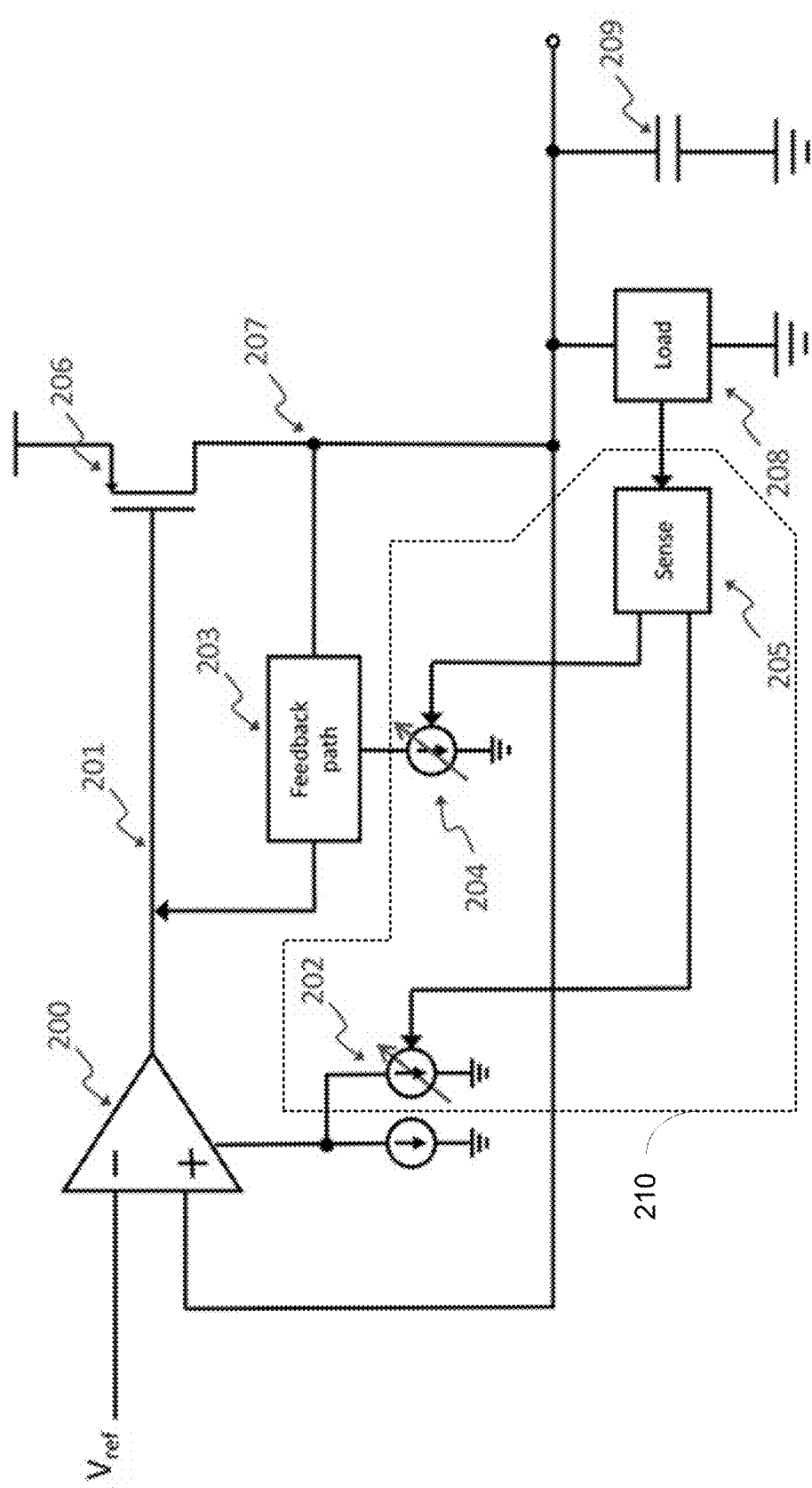
FIG. 4 shows a block diagram of an example embodiment of a nano-watt LDO circuit in accordance with some embodiments.

FIG. 4 shows a block diagram of an example embodiment of a nano-watt LDO circuit in accordance with the present technology. The LDO circuit includes an amplifier 200 coupled to a transistor 206 at the amplifier output 201. The amplifier output 201 can be set as the dominant pole and, contrary to common practice, a capacitance element 209 can be placed at the non-dominant pole position of the LDO circuit, which is the output node 207. In some example implementations, the capacitor is medium-sized, just large enough to handle the worst-case undershoot/overshoot during load steps. In implementations, the nano-watt LDO circuit is connected to a load 208 at the output node 207, in parallel with the capacitance 209.

As discussed above, any explicit capacitance on the non-dominant pole reduces the poles separation and degrades stability. To alleviate this and improve stability, the LDO circuit can include a feedback path or compensation network 203 configured between the output node 207 and the amplifier output 201. This compensation scheme can provide a dual effect on the LDO: (i) introduce a zero in the LDO's loop transfer function, which can be sized to compensate the encroaching non-dominant pole; and (ii) provide Miller multiplication to the dominant pole and improve stability. As is known in the art, the Miller effect causes an increase in the equivalent input capacitance of an inverting voltage amplifier due to amplification of the effect of capacitance between the input and output terminals. In some embodiments, the compensation path circuit 203 includes a capacitor, a common-gate transistor, and a diode-connected transistor, as shown later in FIG. 5. It should be noted that the feedback path can enable flow in either direction and does not necessarily imply a single direction of flow.

This topology shown in FIG. 4 is complemented by a dynamic biasing circuit 210, which includes a sensing unit 205 in connection with the load 208 and internal current sources, represented in the diagram as 202 and 204, connected to the amplifier 200 and feedback path or compensation network 203. The dynamic biasing is a loop mechanism that provides sensing of the load current of the load 208 and replicating a fraction of it inside the LDO circuit. This way, for example, as the load current increases, the LDO circuit's internal bias currents also increase to provide faster slewing and faster overall response. The cell's power draw essentially becomes dynamic in nature (with a small offset for the base static current). In some implementations, for example, the fractional replication of the load current is implemented using current mirroring techniques. With this configuration, the LDO can rapidly scale up its operating current to respond to large load currents, e.g., while remaining capable of regulating the output at extremely low load currents, such as 10 nA or greater, thereby making the LDO circuit advantageous for use in IoT or other low power circuits and devices.

In example implementations, dynamic biasing is applied to the dominant pole (e.g., amplifier output 201), but also to the compensation zero. This way, as the load current rises and the output frequency (e.g., non-dominant pole) increases to a higher frequency, the dominant pole and the compensation zero also follow suit, and move in synchrony with the non-dominant pole. This arrangement keeps the stability of the regulator relatively constant over the whole frequency range.

Figure 5:
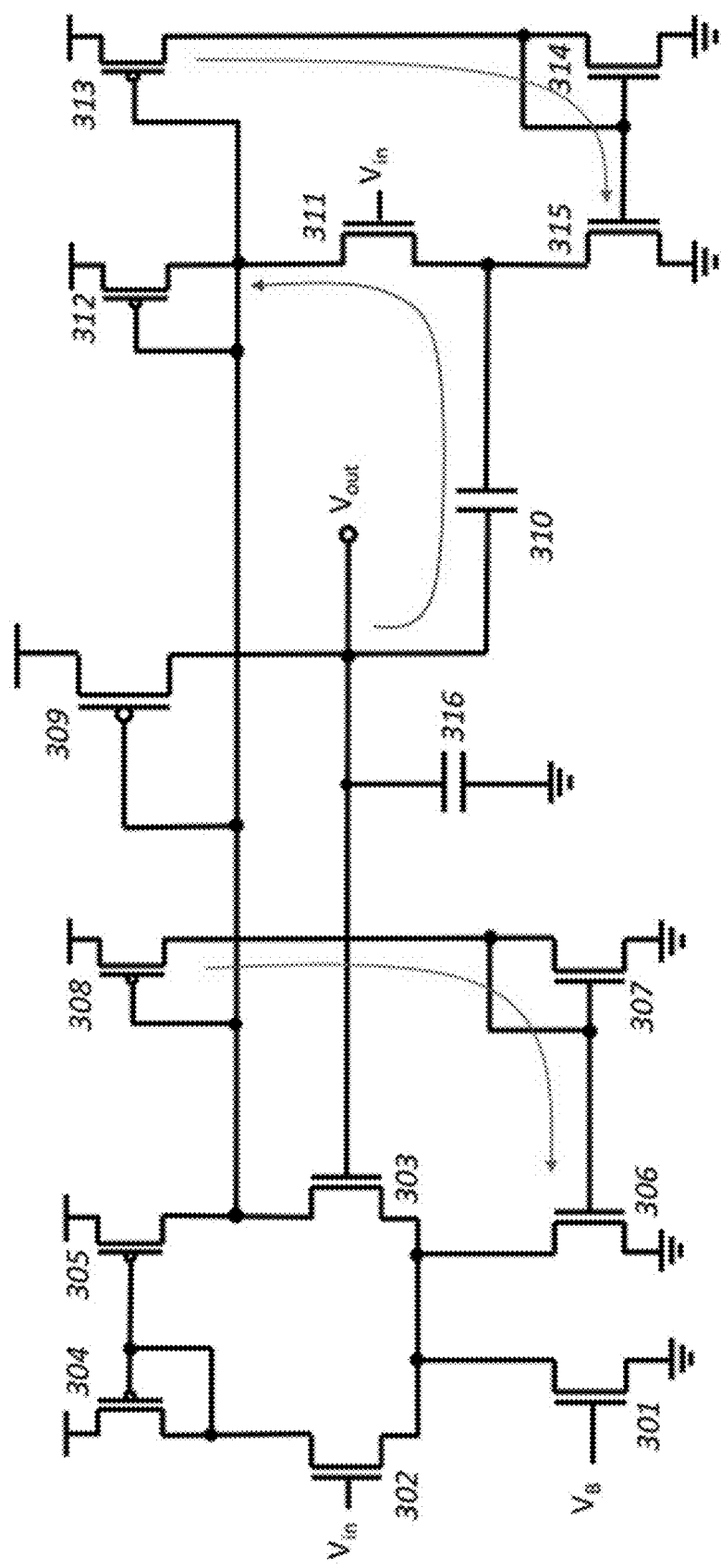
FIG. 5 shows a circuit diagram of an example embodiment of a nano-watt LDO circuit in accordance with some embodiments.

FIG. 5 shows a circuit diagram of an example embodiment of the feedback path or compensation network 203 of the LDO circuit in accordance with the present technology. The circuit in FIG. 5 includes a capacitor 310, a common-gate transistor 311, and a diode-connected transistor 312, combining to introduce a transfer function zero. The transconductance of transistors 311 and 312, and the magnitude of capacitor 310, can be sized such that the zero frequency coincides with the non-dominant frequency. The dynamic biasing path that feeds the error amplifier stage and modulates the dominant pole position, for example, can include transistors 306, 307, and 308. In this configuration, for example, since transistor 309 conducts the entire load current, transistor 308 is sized as a fraction of transistor 309 and therefore conducts a fraction of the load current. In effect, it acts as a load current 'sensor'. The current in transistor 308 is mirrored, through transistors 306 and 307, to the tail of the error amplifier. As the load current increases and the output non-dominant pole moves to higher frequency, this 'dynamic bias' also increases, reducing the amplifier's output impedance, and increasing the amplifier pole frequency. Thus, this dynamic biasing provides a mechanism for both poles to track together.

Similarly, the dynamic biasing path that modulates the position of the zero, for example, can include transistors 313, 314, and 315. Transistor 313 acts as the load current sensor, and feeds a fraction of the load current to the current mirror formed by 314 and 315. This current serves as the "dynamic bias" for the common-gate transistor 311, ensuring that the transfer function zero contributed by this path increases in frequency with higher levels of bias current.

These two dynamic biasing paths provide a mechanism for the dominant pole and compensation zero to track the movement of the non-dominant pole as a result of load changes.

In practical implementations, for example, a frequency tracking mechanism may not be perfect over a wide range of load currents. Transistor transconductance ($g_m$) is a linear function of bias current in the subthreshold region of operation, while it is a square-root function of bias current in the strong inversion region of operation. However, transistor output impedance is an inverse function of the bias current over all regions of operation. If the compensation zero frequency is a function of transconductance, while the pole frequencies (dominant and non-dominant) are primarily functions of output impedances, the tracking can vary as the regions of operation change. One way to reduce this deviation from ideal behavior, for example, is by sizing transistor 311 such that it remains in weak inversion as much as possible, maintaining linear $g_m$ with current. Nevertheless, the effect of this non-ideal behavior is generally small compared to the overall benefit of this technique.

Also, as mentioned before, dynamic biasing is also intended to throttle the speed of operation with varying load amounts. With larger loads, the regulator must respond more swiftly, and therefore requiring higher internal currents to provide faster slew rates to internal signals. The dynamic biasing is able to achieve such capability, in addition to the previously described frequency compensation and tracking mechanism.

Figure 6:
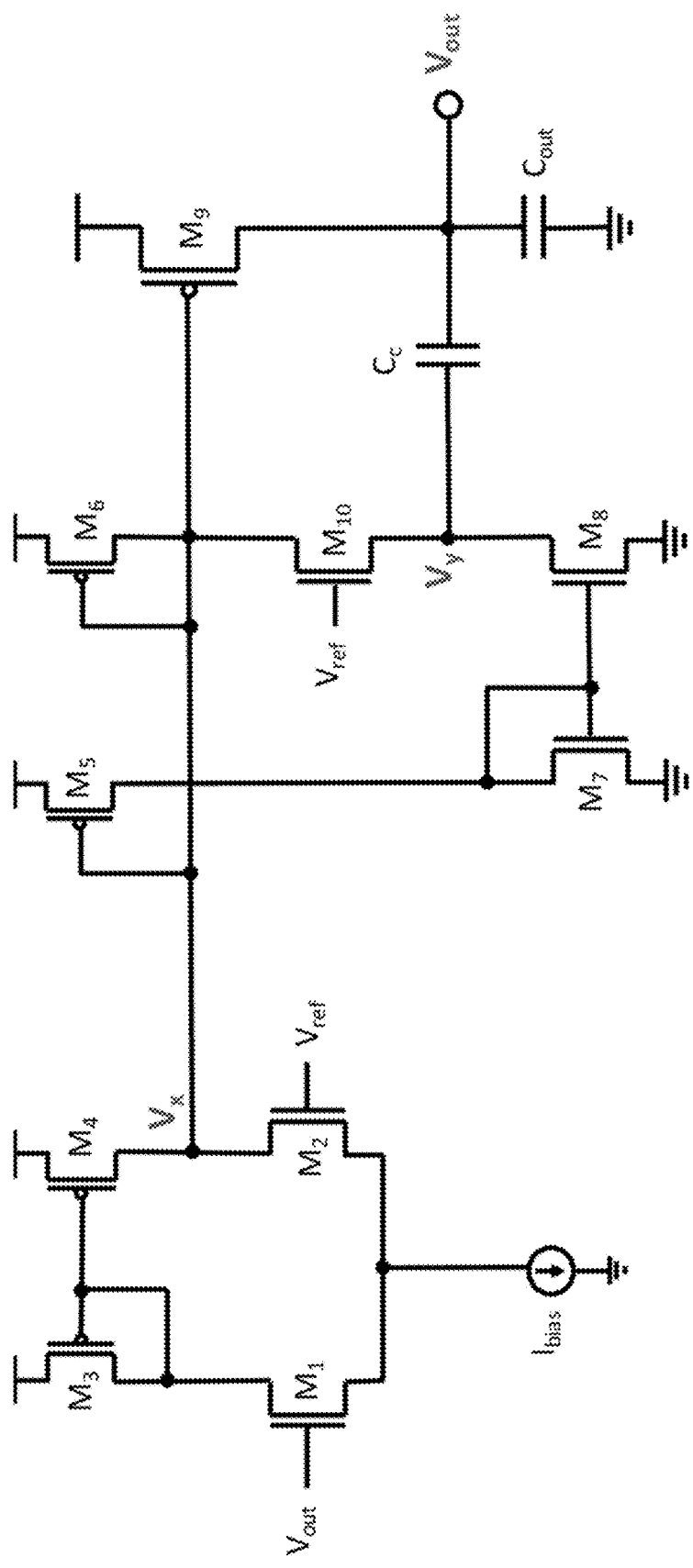
FIG. 6 shows a circuit diagram of another example embodiment of a nano-watt LDO circuit in accordance with some embodiments.

In accordance with some embodiments, the LDO circuit includes a compensation network that is introduced between the amplifier and the output power transistor. FIG. 6 illustrates a block diagram of an example embodiment of a nano-watt LDO circuit in accordance with the present technology that can provide nano-Watt quiescent current operation over a wide load range. In this example embodiment, the compensation network includes a common-source amplifier $M_5$, a current mirror $M_7$ and $M_8$, a common-gate amplifier $M_{10}$ terminated by a diode-connected transistor $M_6$, and connected back to Vx (output of amplifier), and a capacitor $C_c$ connected from the output of $M_{10}$ to the output of the LDO. The compensation network forms a local positive feedback stage, which is embedded within the outer negative feedback loop of the regulator.

In the example circuit of FIG. 6, the amplifier portion of the LDO is depicted as having an active amplifier stage (similar to the bottom circuit in FIG. 2B) and includes the transistors $M_1$ to $M_4$ and the bias current source, $I_{bias}$.

The capacitor $C_c$ forms a Miller capacitor around the common-gate (CG) stage including transistor $M_{10}$ and the output stage including transistor $M_9$. This establishes the pole primarily $V_y$, associated with the common CG stage, as a firmly dominant pole, and pushes the pole, $p_2$, primarily associated with $V_{out}$, to higher frequency (pole-splitting effect). Note that because of the multiple feedback and feedforward loops in the design, the strict association of each node with a pole does not hold true, but there is generally one node that is a stronger contributor. Because the capacitor, $C_c$, is across 2 gain stages, the pole splitting effect is more significant. Also, there is no PSR degradation with this arrangement as the compensation capacitor $C_c$ is well isolated from the supply.

The compensation network contributes a pole/zero pair at $(-g_y/2\pi \cdot C_c)$, where $g_y = g_{m10} + g_{ds8} \approx g_{m10}$ is the admittance at node $V_y$ ($g_{m10}$ and $g_{ds8}$ are admittance of transistor $M_{10}$ and drain-to-source admittance of transistor $M_{10}$, respectively) and $C_c$ is the compensation capacitor. The compensation network also contributes a zero, $z_1$, at $$\left( \frac{g_y}{2\pi \cdot C_c \left( \frac{1+A_M}{k} - 1 \right)} \right),$$

where $A_M = A_{CG} \cdot A_{output}$ is the combined gain of the 2 stages across the Miller capacitor, (i.e., the common-gate stage and the output stage), and $$k = \frac{g_{m9}}{g_{m5}} = \frac{g_{m9}}{g_{m6}},$$

with transistors $M_5$ and $M_6$ sized equally. This zero can be positioned in the left-half plane at a useful frequency, by ensuring that $$\frac{1+A_M}{k} \ll 1,$$

for $k \ll A_M$ (assuming $A_M \gg 1$), which is easily achieved by making the multiplier in $M_5/M_6$ a much smaller value than the large power transistor $M_9$. In one implementation, this ratio was set to 1000. In addition, this size relationship provides a dynamic biasing of the intermediate branch, ensuring that its operating current tracks as a ratio of the load current.

Since the pole splitting effect makes $p_2$ directly proportional to $A_M$, with $A_M \propto g_{m10} \cdot g_{m9}$, and the zero frequency, $z_1$, is proportional to $$g_{m10} = \frac{g_{m9}}{k},$$

it can be seen that $z_1$ naturally tracks $p_2$. Transistor $M_9$ can be sized such that $z_1$ is always at a slightly lower frequency, for good cancelation over process, voltage and temperature (PVT) variations.

Another observation is that since the intermediate stage is terminated to $V_x$ with a diode-connected transistor $M_6$, the output impedance at node $V_x$ is reduced, pushing the pole associated with that node to higher frequency, and making it the $2^{nd}$ non-dominant pole. The associated loss in gain for that stage is not such a concern as there is additional gain through the compensation network. However, the use of cascading in the error amplifier can help boost the gain if needed.

An explicit capacitor, $C_{out}$, is also placed at the output node to provide charge during the first droop. When the load abruptly increases, the regulator's limited gain bandwidth prevents it from responding instantly, and it is the output capacitor which provides that initial charge, thereby inevitably resulting in a first droop. This $C_{out}$ capacitor need only be large enough to contain the droop. As a result, it can be orders of magnitude smaller than if it were sized to establish a dominant pole, and can even be an on-chip capacitor if the load current requirements are small enough.

Figure 7A:
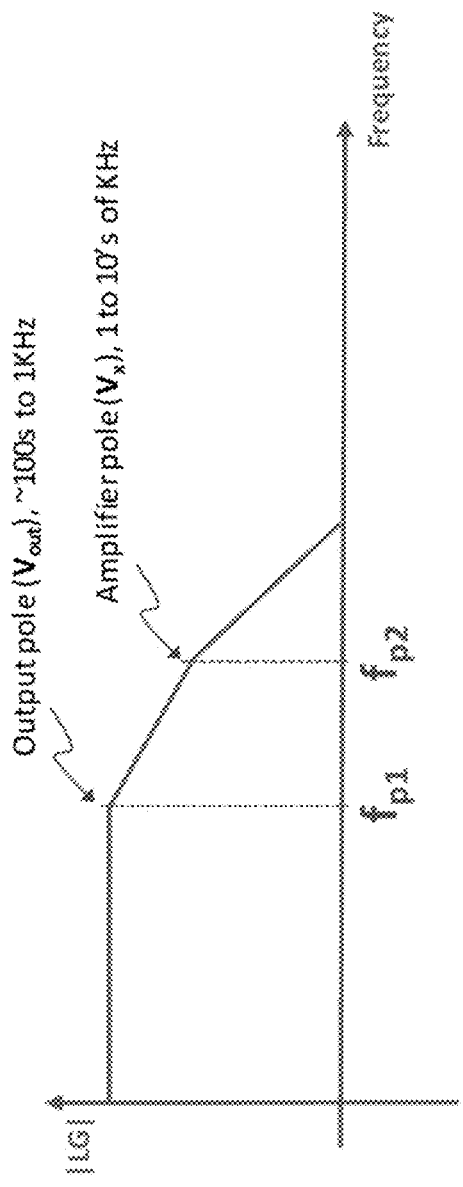
FIG. 7A shows an example frequency response of a conventional LDO with marginal stability.
Figure 7B:
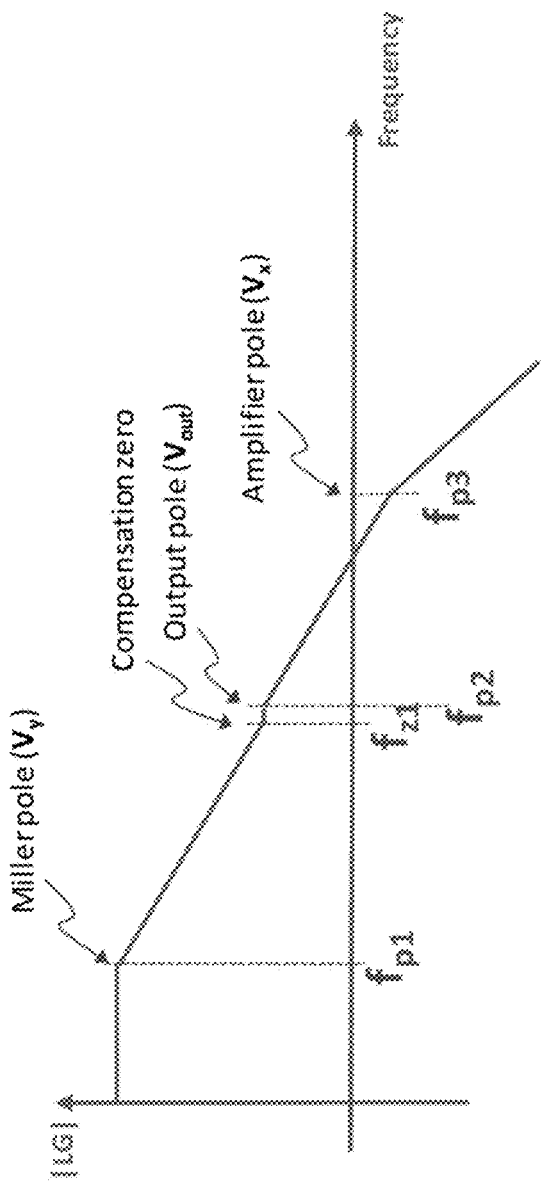
FIG. 7B shows an example frequency response of an LDO in accordance with some embodiments.

FIG. 7A shows an example frequency response of a conventional LDO with marginal stability; FIG. 7B shows an example frequency response of an LDO in accordance with the disclosed embodiments, such as the circuit in FIG. 6. As evident from FIG. 7B, the compensating zero (at $f_{z1}$) tracks and cancels the effects of the pole at $f_{p2}$, thus enabling a large operating bandwidth that extends from $f_{p1}$ to approximately $f_{p3}$.

In some embodiments, the wide operating range and dynamic biasing is achieved at least in part by placing a compensation network between the error amplifier stage and the output stage of the LDO that establishes a dominant pole via Miller multiplication of the compensation capacitor with the combined gain through the compensation stage and the output stage. The output pole forms the first non-dominant pole (e.g., $p_2$), and is placed at a higher frequency via the pole splitting effect. A compensation zero is created that tracks and cancels the first non-dominant pole. The 2nd non-dominant pole (e.g., $p_3$), associated with the output of the error amplifier, is moved to a higher frequency by virtue of the amplifier output being coupled with a lower impedance node of the compensation network.

In order to provide slew-rate enhancement during load transitions, the LDO topology can be complemented by a dynamic biasing loop. As noted earlier, dynamic biasing can be accomplished by sensing the load current and replicating a fraction of it inside the actual circuit. This way, as the load current increases, the circuit's internal bias currents also increase to provide faster slewing in response to sudden and large increases in load current. The size and strength of this dynamic biasing loop needs to be commensurate with the maximum load range. The cell's power draw essentially becomes dynamic in nature (with a small offset for the base static current). The implementation can be done using current mirroring techniques, by providing ratios of the bias currents as a function of the power transistor size.

Figure 8:
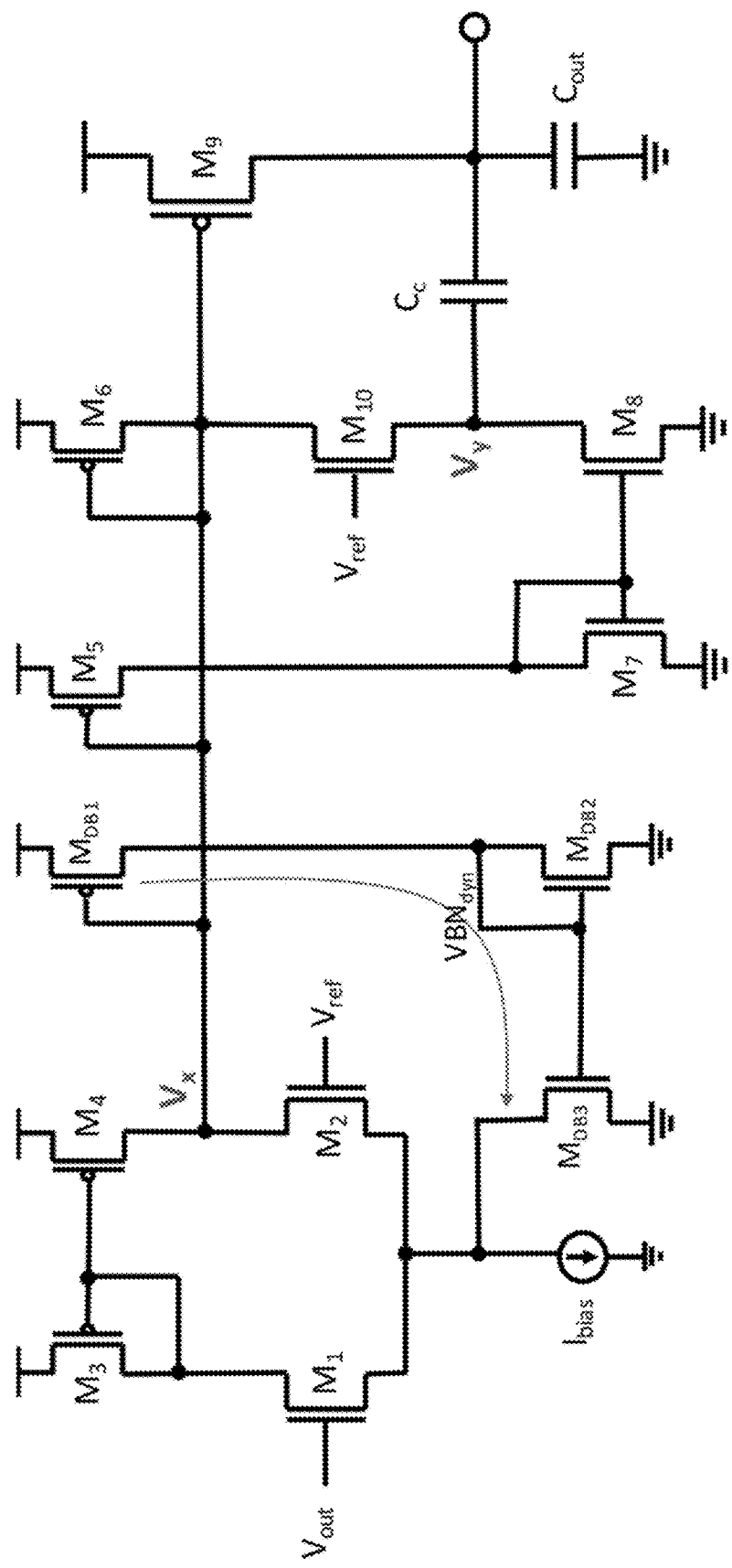
FIG. 8 illustrates an example LDO circuit with dynamic biasing transistors in accordance with some embodiments.

FIG. 5 provided an example circuit that can provide dynamic biasing for the disclosed LDO circuitry. FIG. 8 provides another example of the LDO circuit with the dynamic biasing transistors $M_{DB1}$ to $M_{DB3}$ in accordance with some example embodiments. In FIG. 8, the transistors $M_1$ to $M_{10}$ and capacitors $C_c$ and $C_{out}$ are similar to those shown in FIG. 6. The dynamic biasing allows the error amplifier to operate at faster levels as the load current increases. As mentioned before, the compensation network is also dynamically biased by the load, as $M_5/M_6$ are ratio'd against $M_9$. Therefore, all the dynamics of the system scale with the load current.

Figure 9:
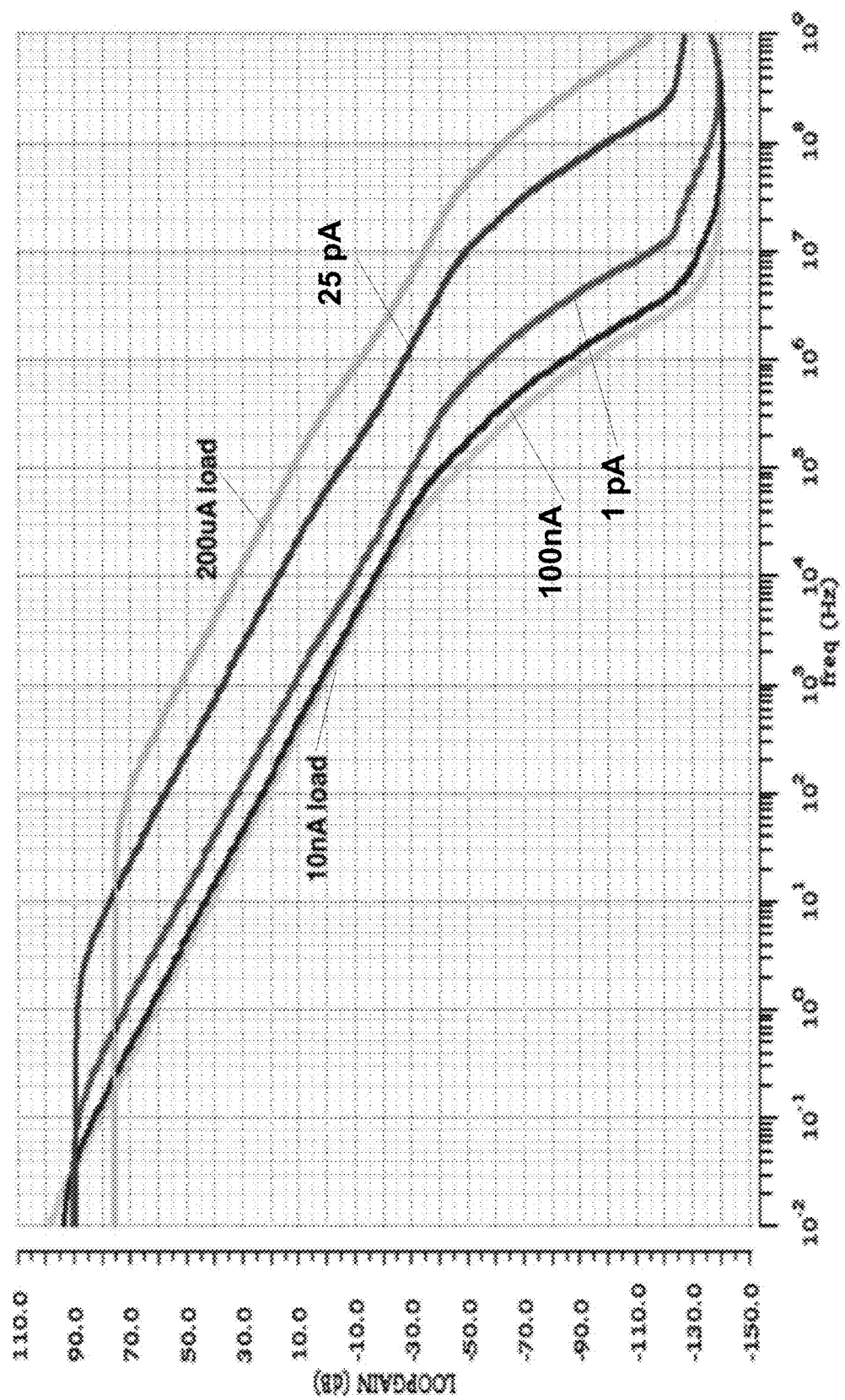
FIG. 9 shows a plot depicting an example frequency response of an example nano-watt LDO circuit over various load currents from 10 nA to 200 uA, showing single-pole roll-off well beyond unity-gain frequency.

FIG. 9 shows a simulation plot depicting a series of example frequency response plots at various load currents for an LDO circuit in accordance with the present technology. The load current range is from 10 nA to 200 uA. This plot illustrates the effect of dynamic biasing on the frequency compensation and the resulting uniformity of the frequency response over the current range. It can be seen that as the load current increases, the frequency of the dominant pole $p_1$ (1st roll-off) also increases. The roll-off at −20 dB/decade remains nearly constant well beyond the unity-gain frequency. At low currents (10 nA and 100 nA), the non-dominant pole and the zero coincide very well and the −20 dB/decade roll-off is virtually uninterrupted through the cross-over frequency and beyond. The next roll-off is the 2nd non-dominant pole, $p_3$, primarily contributed by the amplifier output. For the higher current cases, there is a slight dip and recovery in the plot due to expected mismatches in the frequencies of $p_2$ and $z_1$, which is not of concern.

Fast Slew-rate Enhancement Loop

The above dynamic biasing scheme in some applications is sufficient for load currents steps from about tens of nA to tens or hundreds of uA. This is because the main dynamic biasing loop is derived from the power transistor's pass gate having a limited speed, and may thus be unable to handle load steps at higher currents, without incurring significant droop in the output. In order to handle higher currents, an additional structure can be introduced.

Figure 10:
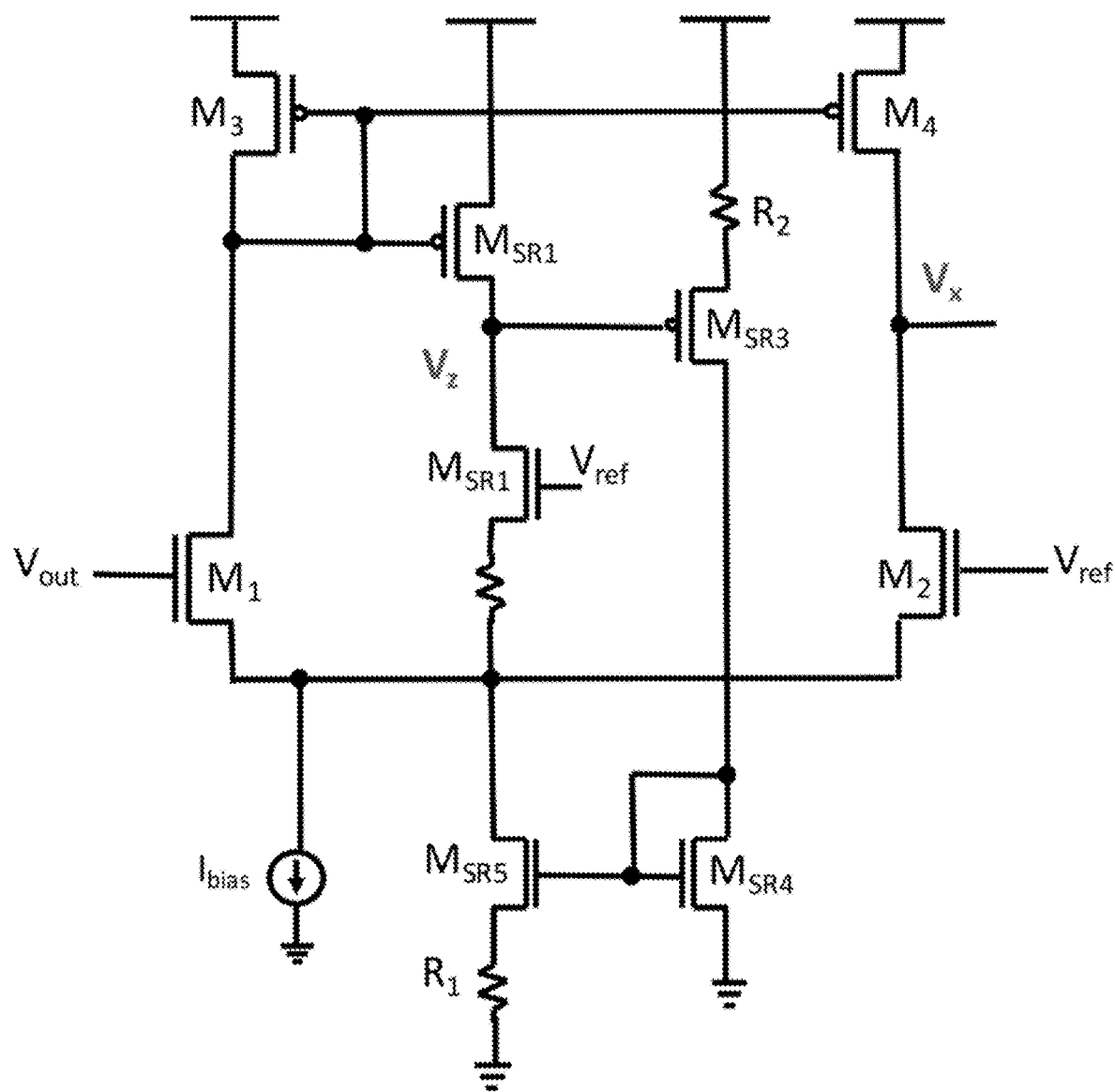
FIG. 10 illustrates an example slew enhancement circuit in accordance with some embodiments.

FIG. 10 illustrates an example slew enhancement circuit in accordance with some embodiments. The circuit in FIG. 10 includes transistors M1 to M4 and $I_{bias}$ that are similar to those discussed in connection with FIG. 6. The circuit further includes transistors $M_{SR1}$ to $M_{SR5}$ that form a fast loop that responds more rapidly to changes in the output voltage. The fast loop turns on at the onset of a low-to-high load step (i.e., the load current switches from low to high), and turns off after the output droop is compensated and the regulator voltage returns to its target value. The operation of this circuit is as follows: Transistors $M_{SR1}$ and $M_{SR2}$ form an inverting gate, with the PFET $M_{SR1}$ biased by the current mirror, and the NFET $M_{SR2}$ biased by the reference voltage. At steady-state, the output of this inverter is high enough to keep the PFET $M_{SR1}$ off and subsequently the mirror branch including of $M_{SR4}$ and $M_{SR5}$ also off. When $V_{out}$ drops due to a surge in the load current, the current through $M_1$ decreases, and NFET $M_{SR2}$ begins to draw a larger portion of the bias current $I_{bias}$. At the same time, the mirrored current through PFET $M_{SR1}$ also diminishes. This causes the inverter output, $V_z$, to discharge low, turning on the common-source PFET $M_{SR3}$ and allowing the mirror branch including $M_{SR4}$ and $M_{SR5}$ to inject a large tail current into the amplifier. This fast and large injection of current allows node $V_x$ to discharge more rapidly, thereby significantly boosting the slew-rate characteristic of the error amplifier.

Once $V_x$ has slewed low enough and the output voltage has been charged back up through the power transistor (not shown in FIG. 10), $M_1$ and $M_3$ conduct more current again, while the source-degenerated NFET $M_{SR2}$ conducts less current. This results in node $V_z$ (sometime referred to in this document as the output of the inverting gate) being pulled high again, thereby turning off the fast loop and removing it from circuit operation. By this time, the main dynamic biasing loop (e.g., shown in FIG. 8) is fully turned on, and provides all the bias current needed at the new operating point. Because both loops (fast and slow) operate on the tail bias current, they can co-exist and the transition between them in both directions can occur smoothly, without any concern for failure or lock-up. Some non-sustaining nonlinear oscillations can occur during the transitions if the fast positive-feedback loop is too strong. Tail resistors R1 and R2 are included for that purpose, to make the transitions more gradual and free of oscillations.

Because the inner fast loop (i.e., the fast loop shown in FIG. 10) is a positive feedback loop, it must be biased carefully in order to ensure that it only turns on during low-to-high load transitions, and does not conduct current during idle/standby conditions, such as when there is a low load current. To that end, the sizing of the inverter FETs is an important consideration. At steady-state with the regulator output at about the $V_{ref}$ voltage, both sides of input differential pair (NFETs $M_1$ and $M_2$), as well as the mirror PFET $M_3$ all draw the same current. Thus, if the width/length ratio of $M_{SR1}$ is set as a ratio of the width/length of $M_3$, and similarly, the width/length ratio of NFET $M_{SR2}$ is set at the same ratio against the width/length of $M_2$, the inverter will be balanced. If the size of $M_{SR1}$ is increased beyond this ratio, the inverter will be unbalanced and the inverter output will be biased higher, thereby ensuring that the loop is kept OFF in the standby state.

However, controlling this inverter output $V_z$ such that $M_{SR3}$ remains off is difficult to ensure in a robust manner, without significantly increasing the width/length ratio of the PFET with respect to the NFET in the inverter, and guardbanding for PVT mismatch and model inaccuracies. Also, the higher the biasing voltage of $V_z$, the longer the turn-on time of this fast loop, which negates its intended use. A more reliable mechanism for controlling the bias point of this loop is to control/clamp the current through PFET $M_{SR3}$. To that end, in some embodiments an auxiliary servo loop is included in the circuit, as shown, for example, in the circuit of FIG. 11.

Figure 11:
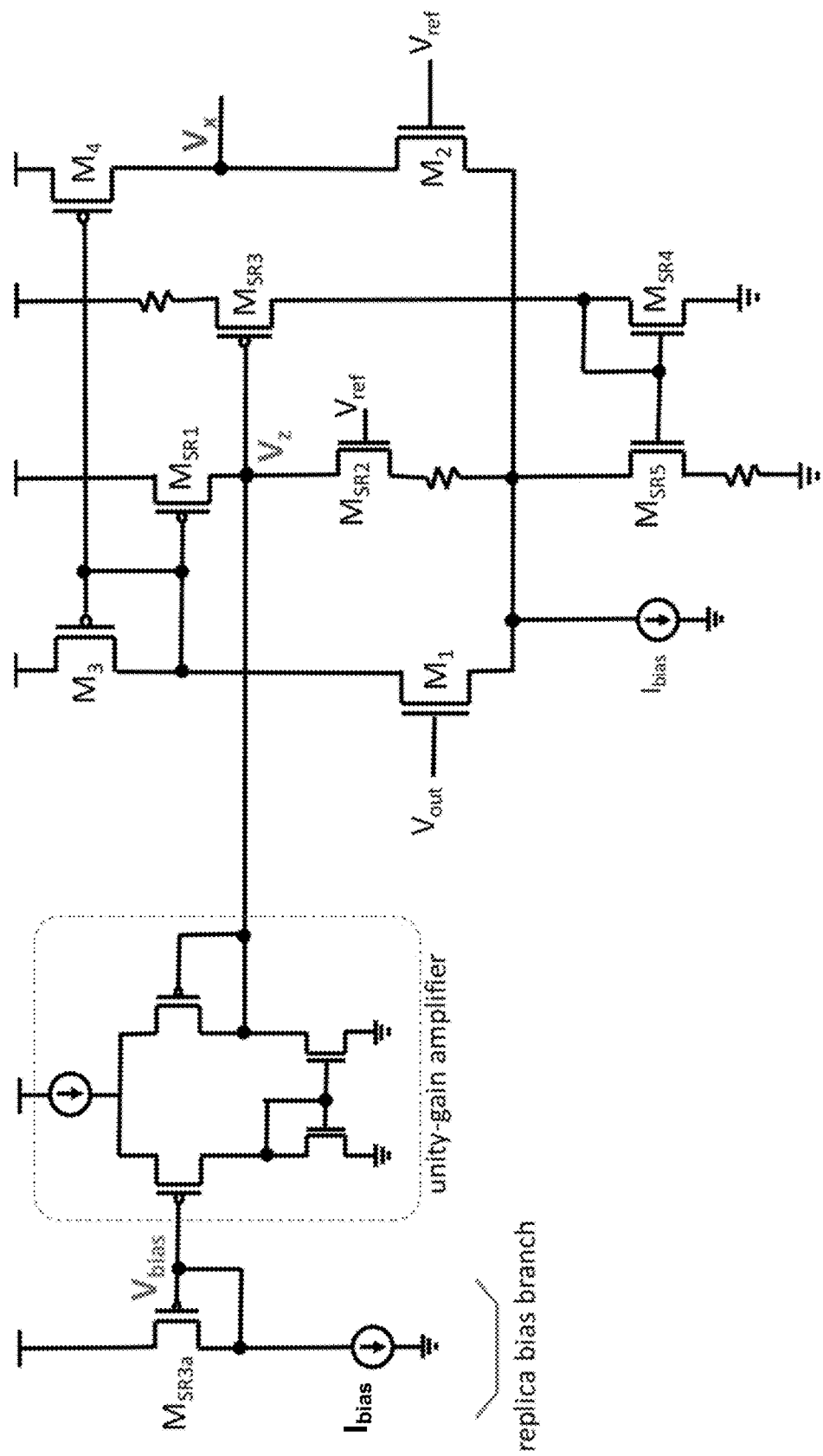
FIG. 11 illustrates an example slew enhancement circuit with bias control point in accordance with some embodiments.

The circuit in FIG. 11 includes a replica bias branch, and a single-stage voltage amplifier connected in unity-gain feedback. This amplifier need only have moderate gain, and therefore a single stage amplifier is sufficient, similar to the error amplifier portion of the regulator, embodied by M1-M4 and the bias current $I_{bias}$ in FIG. 8. Transistor $M_{SR3a}$ in the replica bias branch is sized as a multiple of $M_{SR3}$ in the fast loop, and the amplifier feedback ensures that in the idle state with the loop off, the current in $M_{SR3}$ is set to a ratio of the current in the bias branch. For example, if $M_{SR3a}$ is 8 times larger than $M_{SR3}$, and the bias current is at 5 nA, the quiescent current of $M_{SR3a}$ is pinned at 625 pA. This of course requires the amplifier to have a reasonable gain, and sufficient source/sink current to hit the target operating point, both of which are easily satisfied in this scenario. This auxiliary loop only sets the quiescent operating condition, and does not interfere with normal operation of the fast loop. This is because the biasing current provided by the feedback amplifier to node $V_z$, is much smaller than the pull-down strength of MSR2 during a load event.

The arrangement described herein satisfies the two key requirements for slew rate enhancement and control for a low-to-high load current event, that is, minimal quiescent current consumption and fastest possible response time.

Overshoot Control Circuits

The opposite of the low-to-high load step scenario, that is, the high-to-low current step, can also present a significant design challenge, depending on the application and topology. In dynamically biased LDO topologies where the internal current varies with the load current, a sudden removal of load current will trigger the dynamic biasing loop to turn off most of the LDO's internal biasing current, thereby slowing down the charging-up of the pass transistor's (e.g., $M_9$ in FIG. 6) gate voltage and allowing the output voltage to continue rising. This overshoot may cause electrical over-stress or timing violations in the downstream circuits. In addition, because the load current has become very low, the eventual decay after the peak point is also very slow, resulting in a long decaying time. Thus, the lower the peak voltage of the overshoot, the shorter the overshoot window will be.

Figure 12:
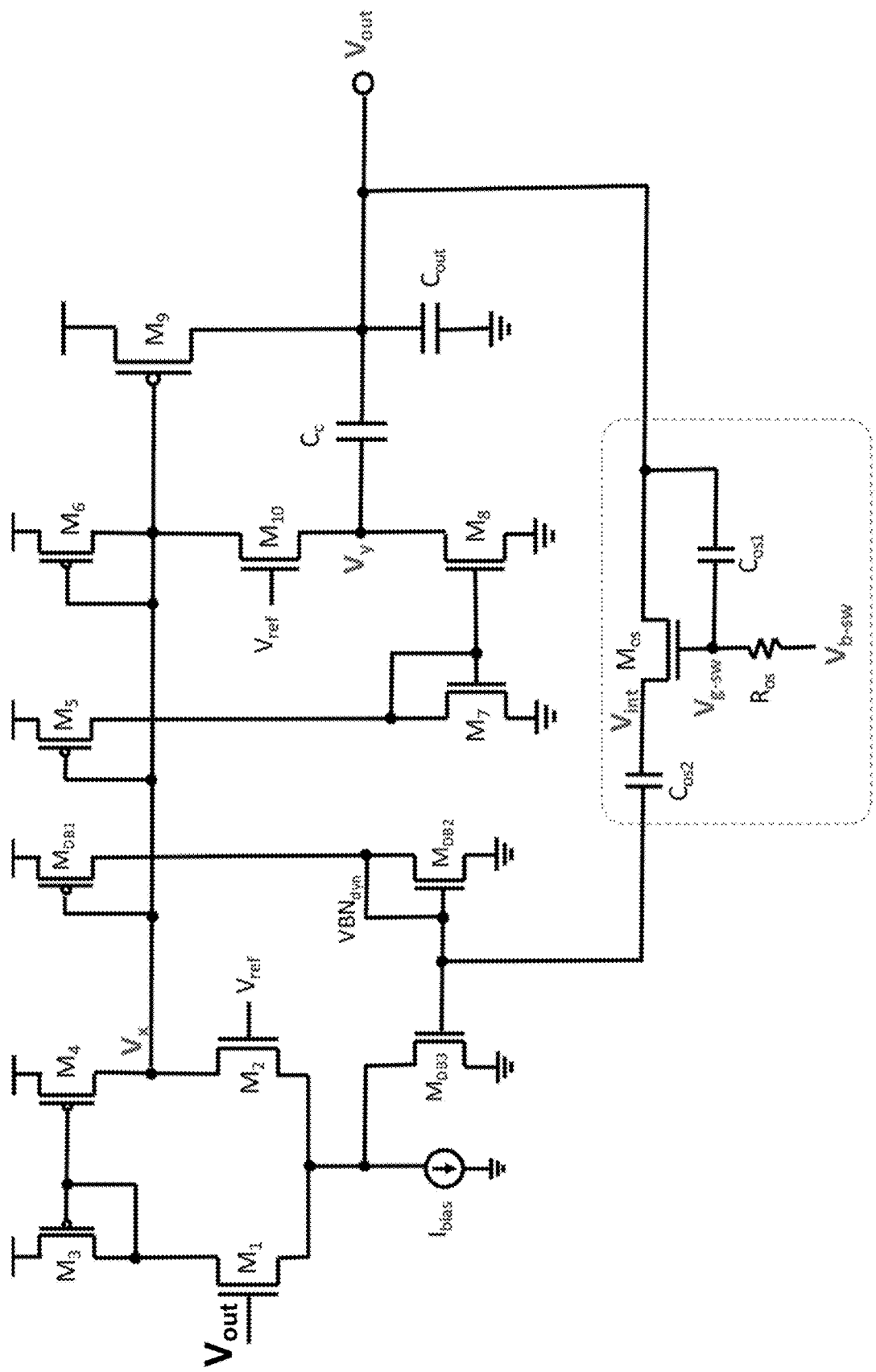
FIG. 12 illustrates an overshoot control circuit in accordance with some example embodiments.

FIG. 12 illustrates an overshoot control circuit in accordance with some example embodiments that addresses the above noted problems. The circuit in FIG. 12 includes transistors M1 to M10, $M_{DB1}$ to $M_{DB3}$, as previously described, in addition to a transistor $M_{OS}$ acting as a series switch, with its gate and source/drain coupled through a capacitor $C_{OS1}$, and the gate driven through resistor $R_{OS}$ by an appropriate voltage. This series switch is coupled to the dynamic biasing node ($VBN_{dyn}$) through a series capacitor $C_{OS2}$. In normal operation, with $V_{out}$ stable, there is no current flowing through the series capacitor $C_{OS2}$. When $V_{out}$ experiences a transient surge due to a drop in the load current, $V_{out}$ couples to $V_{g\text{-}sw}$ (i.e., the gate voltage of MOS) through capacitor $C_{OS1}$, increasing the gate-to-source voltage ($V_{GS}$) of $M_{OS}$, and making it more conductive. A certain amount of transient current flows through $M_{OS}$ (with $V_{out}$ as the drain voltage and $V_{int}$—not shown—as the source voltage) and the series capacitor $C_{OS2}$, which provides a positive charge to node $VBN_{dyn}$. This positive charge works against the effect of the dynamic biasing loop that is attempting to discharge $VBN_{dyn}$, and allows more bias current to remain available to the error amplifier to discharge the gate of $M_3/M_4$ so that $V_x$ can be charged up through $M_4$. Node Vg-sw eventually discharges back to Vb-sw through resistor $R_{OS}$. This resistor must be sized such that the 'on' time of the switch is longer than the expected overshoot event, which is a small value as the overshoot event needs to be short.

This circuit is only needed and active during a high-to-low load event, and does not interfere with the rest of the LDO's operation during a low-to-high load event. This can be seen by the fact that during a low-to-high load event, when $V_{out}$ experiences a sudden drop, node Vg-sw is pumped to a lower voltage, thereby making it less conductive.

The optimum value for $V_{b\text{-}sw}$ is a voltage that is slightly offset from the $V_{ref}$ voltage to the LDO, such that $M_{OS}$ is biased in subthreshold. For instance, it can be about 200 mV higher than $V_{ref}$ which is well below threshold voltage values in typical MOSFETs technologies. This way, $M_{OS}$ can transition to strong inversion with a positive step, and to deeper subthreshold on a negative step. Depending on implementation, this voltage may be easily tapped from the same hardware that is generating the $V_{ref}$ voltage, with minimal overhead.

Example features of the LDO circuit are described below.

Nano-watt LDO circuit with stable and fast response to a broad range of load currents, and minimal quiescent current consumption Nano-watt LDO where an additional network between the error amplifier and the output stage introduces a dominant pole via Miller multiplication.

Nano-watt LDO where said additional network introduces a compensation zero, with a frequency that is set by the ratio of PFETs in the compensation network, to the output PFET Nano-watt LDO where the output node contributes the non-dominant pole, and is pushed to a higher frequency via the pole-splitting effect.

Nano-watt LDO where a much smaller output capacitor is required for stable operation, than if the output node was set as the dominant pole.

Nano-watt LDO where the compensation zero and the first non-dominant pole track by design across the load current range, providing a non-varying stable frequency response.

Nano-watt LDO where the second non-dominant pole is contributed by the amplifier output node, and is pushed to a higher frequency, by virtue of having its output shared with the compensation network.

Nano-watt LDO including a dynamic biasing scheme to scale the cell's bias current with the output load current, and allow faster response with higher load currents Nano-watt LDO where the dynamic biasing loop encompasses the dominant pole, the compensation zero, and the first and second non-dominant poles, such that that all primary determinants of the frequency response move together with the output load current, maintaining a uniform stability profile.

Nano-watt LDO where an additional fast loop is introduced within the error amplifier stage, with the function of boosting the error amplifier's bias current during a short time window immediately after a low-to-high load current event, thereby significantly improving the LDO's response.

Nano-watt LDO where the fast loop integrates seamlessly with the outer dynamic biasing loop, turning on first to allow fastest possible response, then turning off once the (slower) dynamic biasing loop has engaged.

Nano-watt LDO where the bias point of the fast loop is optimally set by an auxiliary replica-bias structure, at a point that provides the best combination of response time and quiescent current consumption.

Nano-watt LDO with a simple overshoot control circuit consuming no static current. This circuit protects the LDO against potentially high overshoots that can occur in high-to-low load current events, such as when activity is suddenly halted or a power-domain is collapsed.

In some implementations, the nano-watt LDO circuit is designed to include a dominant pole at the amplifier output, e.g., due to its extremely high impedance, without any explicit capacitance, and a non-dominant pole is located at the output of the LDO. For example, a filtering capacitor is placed on the non-dominant pole at the output node, and no explicit capacitor is placed on the dominant pole. In such implementations, this configuration of a nano-watt LDO is contrary to a conventional design.

The nano-watt LDO circuit can compensate for stability deterioration due to the explicit capacitor with a secondary compensation loop that introduces a transfer function zero that substantially tracks (and thus compensates for) the non-dominant pole. Such a configuration establishes, via Miller multiplication, a dominant pole associated with an internal node of the compensation network, rather than the amplifier or the LDO output.

In some example implementations, the LDO circuit includes a dynamic biasing loop to scale the cell's bias current with the output load current. The dynamic biasing loop encompasses the dominant pole as well as the compensation zero, such that all primary determinants of the frequency response, e.g., the dominant pole, the $1^{st}$ non-dominant pole, and the compensation zero, vary uniformly with the output load current, maintaining a uniform stability profile over the load current range.

In some embodiments a low-dropout regulator (LDO) circuit is described that includes an amplifier having a first and a second input, the first input coupled to a reference voltage source and the output configured to supply an output current to a load. The LDO includes a transistor coupled to an output of the amplifier, wherein a first terminal of the transistor is coupled to a source voltage VDD and a second terminal of the transistor is coupled to an output of the LDO circuit. The LDO also includes a capacitor connected to the output LDO circuit, and a feedback circuit configured to provide feedback between the LDO circuit output and the amplifier output, where the feedback circuit introduces a compensation zero in a transfer function of the LDO that substantially tracks and compensates for a non-dominant pole of the transfer function. The LDO additionally includes a dynamic biasing loop including a sensor circuit to sense current from the load and replicate a fraction of the current to supply one or both of the feedback circuit and the amplifier.

In some embodiments, the transfer function includes a dominant pole that is determined by the output characteristics of the amplifier, where the transfer function further includes a non-dominant pole that is determined at least in part by the capacitor at the LDO output. In another embodiment, the feedback circuit introduces a Miller multiplication factor for the dominant pole. In yet another example embodiment, the feedback circuit and dynamic biasing loop are configured to provide stability by regulating the LDO circuit output at a constant voltage over a range of load currents including a range of tens of nA to hundreds of uA.

In some embodiments, the LDO circuit is configured to synchronize movements of a dominant pole and the compensation zero of the transfer function with movements of the non-dominant pole in response to changes in a load current. In yet another example embodiment, the feedback path includes a capacitor connected to a gate transistor and a diode-connected transistor. In some embodiments, the LDO circuit is configured to operate at ultra low power levels in nanowatt range.

In another aspect of the disclosed embodiments, an LDO circuit an output stage configured to supply a current to load, an amplifier circuit configured to drive the output stage, and a feedback circuit including a current sensor, one or variable current sources, and configured to (i) introduce a zero in a transfer function of the LDO, and (ii) provide tracking of both a dominant pole and the zero with a non-dominant pole of the transfer function in response to changes in a load current detected by the current sensor.

The disclosed low-dropout regulators (LDOs) can operate at ultra-low power in standby mode, and are capable of throttling its operating current and internal slew rates to higher levels in the presence of higher load currents, such that an output voltage of the LDO is optimally maintained regardless of the level of load current pull at the output.

One aspect of the disclosed embodiments relates to a low-dropout regulator (LDO) circuit that includes an amplifier having a first input and a second input. The first input of the amplifier is configured to receive a voltage from a reference voltage source and the second input is coupled to an output of the LDO circuit. The LDO further includes an output stage transistor coupled to an output of the amplifier, where a first terminal of the output stage transistor is coupled to a source voltage and a second terminal of the output stage transistor is coupled to the output of the LDO circuit. The LDO circuit also includes an output capacitor connected to the output LDO circuit, and a compensation circuit coupled between the LDO circuit output and the output stage amplifier output, the compensation circuit including at least one capacitor and at least one transistor that introduce a compensation zero in a transfer function of the LDO circuit that substantially tracks and compensates for a first non-dominant pole of the transfer function of the LDO circuit. The transfer function includes a dominant pole having a location that is determined at least in-part by a value of the at least one capacitor in the compensation circuit.

In one example embodiment, the compensation circuit, together with the output stage, is configured to introduce a Miller multiplication factor for the at least one capacitor in the compensation circuit. In another example embodiment, a location of the first non-dominant pole is determined at least in-part by the value of the at least one capacitor in the feedback circuit. In yet another embodiment, the LDO circuit is configured to synchronize movements of the dominant pole and the compensation zero of the transfer function with movements of the first non-dominant pole in response to changes in a load current delivered to an output load. In still another example embodiment, the transfer function of the LDO circuit further includes a second non-dominant pole having a location that is determined at least in-part by a shared output of the amplifier and the compensation circuit. According to another example embodiment, the location of the second non-dominant pole in an output frequency response of the LDO circuit is at a higher frequency than locations of the dominant pole and the first non-dominant pole. In another example embodiment, the location of the second non-dominant pole in the output frequency response of the LDO circuit is associated with a loop gain value of less than one.

In one example embodiment, the compensation circuit includes a common-gate stage comprising a common-gate amplifier. In another example embodiment, the common-gate stage is positioned to, in cooperation with the at least one capacitor in the feedback circuit, introduce a pole-shifting effect that produces the first non-dominant pole and the dominant pole at different frequency locations in an output frequency response of the LDO circuit. According to another example embodiment, the compensation circuit includes a current mirror coupled to the common-gate transistor, and at least one diode-connected transistor coupled to the common-gate transistor, the amplifier output and a third terminal of the output stage amplifier.

According to another example embodiment, the output capacitor value is selected to compensate for an initial droop in an output frequency response of the LDO circuit. In another example embodiment, the LDO circuit is configured to operate at ultra low power levels in nanowatt range. In another example embodiment, the LDO circuit includes an additional dynamic biasing loop to sense current from a load coupled to the output stage amplifier and to replicate a fraction of the current to supply one or both of the compensation circuit and the output stage amplifier. In still another example embodiment, the dynamic biasing loop is configured to control movements of the dominant pole, the compensation zero, the first non-dominant pole and a second non-dominant pole of the transfer function such that the poles and the compensation zero move in a synchronized manner as the output current load changes to maintain a uniform stability profile. In another example embodiment, the output current load changes in a range of tens of nA to tens of milliAmps.

In one example embodiment, the LDO circuit includes a dynamic biasing loop that includes three transistors coupled to the output of the amplifier, to a third terminal of the output stage transistor and to a bias current source of the amplifier. In another example embodiment, the LDO circuit includes a slew-rate enhancement circuit coupled to the amplifier and including a plurality of transistors that form an inverting gate and a current mirror configuration, the slew-rate enhancement circuit configured to boost the amplifier's bias current during a low-to-high transition. In yet another example embodiment, the LDO circuit include a bias point control circuit comprising a replica bias circuit and a unity-gain amplifier circuit configured to set a quiescent operating point of the slew rate enhancement circuit. In still another example embodiment, the LDO circuit includes an overshoot control circuit coupled between the output of the LDO circuit and a dynamic biasing network coupled to the amplifier. The overshoot control circuit comprises a plurality of capacitors and a transistor that are configured to become active during a high-to-low transition in an output current of the LDO circuit.

Another aspect of the disclosed embodiments relates to an LDO that includes an output stage circuit configured to supply a current to a load, an amplifier circuit configured to drive the output stage and coupled to the output stage circuit in part via a positive feedback loop. The LDO also includes a compensation circuit positioned between the amplifier output and the output stage. The compensation circuit includes a common-gate amplifier coupled to a compensation capacitor that introduces a compensation zero that tracks a non-dominant pole of a transfer function of the LDO in frequency domain over a predetermined range of currents supplied to the load, to thereby produce a uniform output frequency response for the LDO.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented in electrical connection with one or more data processing units operated using one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit", "data processing device" or "data processing apparatus" encompasses all apparatus, devices, and machines for processing data, including by way of example a programmable processor, a computer, or multiple processors or computers. Such data processing apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A low-dropout regulator (LDO) circuit, comprising:
    an amplifier having a first input and a second input, the first input configured to receive a voltage from a reference voltage source and the second input coupled to an output of the LDO circuit;
    an output stage transistor coupled to an output of the amplifier, wherein a first terminal of the output stage transistor is coupled to a source voltage and a second terminal of the output stage transistor is coupled to the output of the LDO circuit;
    an output capacitor connected to the output of the LDO circuit; and
    a compensation circuit coupled between the output of the LDO circuit and the output of the output stage transistor, the compensation circuit including at least one capacitor and at least one transistor that introduce a compensation zero in a transfer function of the LDO circuit that substantially tracks and compensates for a first non-dominant pole of the transfer function of the LDO circuit, the transfer function including a dominant pole having a location that is determined at least in-part by a value of the at least one capacitor in the compensation circuit,
    wherein the LDO circuit is configured to synchronize movements of the dominant pole and the compensation zero of the transfer function with movements of the first non-dominant pole in response to changes in a load current delivered to the output of the LDO circuit.

2. The LDO circuit of claim 1, wherein the compensation circuit, together with the output stage transistor, is configured to introduce a Miller multiplication factor for the at least one capacitor in the feedback circuit.

3. The LDO circuit of claim 1, wherein a location of the first non-dominant pole is determined at least in-part by the value of the at least one capacitor in the compensation circuit.

4. The LDO circuit of claim 1, wherein the transfer function of the LDO circuit further includes a second non-dominant pole having a location that is determined at least in-part by a shared output of the amplifier and the compensation circuit.

5. The LDO circuit of claim 4, wherein the location of the second non-dominant pole in an output frequency response of the LDO circuit is at a higher frequency than locations of the dominant pole and the first non-dominant pole.

6. The LDO circuit of claim 5, wherein the location of the second non-dominant pole in the output frequency response of the LDO circuit is associated with a loop gain value of less than one.

7. The LDO circuit of claim 1, wherein the compensation circuit includes a common-gate stage comprising a common-gate amplifier.

8. The LDO circuit of claim 7, wherein the common-gate stage is positioned to, in cooperation with the at least one capacitor in the feedback circuit, introduce a pole-shifting effect that produces the first non-dominant pole and the dominant pole at different frequency locations in an output frequency response of the LDO circuit.

9. The LDO circuit of claim 7, wherein the compensation circuit includes a current mirror coupled to the common-gate transistor, and at least one diode-connected transistor coupled to the common-gate transistor, the amplifier output and a third terminal of the output stage transistor.

10. The LDO circuit of claim 1, wherein the output capacitor value is selected to compensate for an initial droop in an output frequency response of the LDO circuit.

11. The LDO circuit of claim 1, configured to operate at ultra low power levels in nanowatt range.

12. The LDO circuit of claim 1, comprising an additional dynamic biasing loop to sense current from a load coupled to the output stage transistor and to replicate a fraction of the current to supply one or both of the compensation circuit and the output stage transistor.

13. The LDO circuit of claim 12, the dynamic biasing loop is configured to control movements of the dominant pole, the compensation zero, the first non-dominant pole and a second non-dominant pole of the transfer function such that the poles and the compensation zero move in a synchronized manner as the output current load changes to maintain a uniform stability profile.

14. The LDO circuit of claim 13, wherein the output current load changes in a range of tens of nA to tens of milliAmps.

15. The LDO circuit of claim 1, comprising a dynamic biasing loop that includes three transistors coupled to the output of the amplifier, to a third terminal of the output stage transistor and to a bias current source of the amplifier.

16. The LDO circuit of claim 1, comprising a slew-rate enhancement circuit coupled to the amplifier and including a plurality of transistors that form an inverting gate and a current mirror configuration, the slew-rate enhancement circuit configured to boost the amplifier's bias current during a low-to-high transition.

17. The LDO circuit of claim 16, further comprising a bias point control circuit comprising a replica bias circuit and a unity-gain amplifier circuit configured to set a quiescent operating point of the slew-rate enhancement circuit.

18. The LDO circuit of claim 16, further comprising an overshoot control circuit coupled between the output of the LDO circuit and a dynamic biasing network, the overshoot control circuit comprising a plurality of capacitors and a transistor that are configured to become active during a high-to-low transition in an output current of the LDO circuit.

19. A low-dropout regulator (LDO) circuit, comprising:
    an amplifier having a first input and a second input, the first input configured to receive a voltage from a reference voltage source and the second input coupled to an output of the LDO circuit;
    an output stage transistor coupled to an output of the amplifier, wherein a first terminal of the output stage transistor is coupled to a source voltage and a second terminal of the output stage transistor is coupled to the output of the LDO circuit;
    an output capacitor connected to the output of the LDO circuit; and
    a compensation circuit coupled between the output of the LDO circuit and the output of the output stage transistor, the compensation circuit including at least one capacitor and at least one transistor that introduce a compensation zero in a transfer function of the LDO circuit that substantially tracks and compensates for a first non-dominant pole of the transfer function of the LDO circuit, the transfer function including a dominant pole having a location that is determined at least in-part by a value of the at least one capacitor in the compensation circuit, wherein the transfer function of the LDO circuit further includes a second non-dominant pole having a location that is determined at least in-part by a shared output of the amplifier and the compensation circuit.

20. The LDO circuit of claim 19, wherein the location of the second non-dominant pole in an output frequency response of the LDO circuit is at a higher frequency than locations of the dominant pole and the first non-dominant pole.

21. The LDO circuit of claim 20, wherein the location of the second non-dominant pole in the output frequency response of the LDO circuit is associated with a loop gain value of less than one.

22. The LDO circuit of claim 19, wherein the compensation circuit, together with the output stage transistor, is configured to introduce a Miller multiplication factor for the at least one capacitor in the feedback circuit.

23. The LDO circuit of claim 19, wherein a location of the first non-dominant pole is determined at least in-part by the value of the at least one capacitor in the compensation circuit.

24. A low-dropout regulator (LDO) circuit, comprising:
an amplifier having a first input and a second input, the first input configured to receive a voltage from a reference voltage source and the second input coupled to an output of the LDO circuit;
an output stage transistor coupled to an output of the amplifier, wherein a first terminal of the output stage transistor is coupled to a source voltage and a second terminal of the output stage transistor is coupled to the output of the LDO circuit;
an output capacitor connected to the output of the LDO circuit;
a compensation circuit coupled between the output of the LDO circuit and the output of the output stage transistor, the compensation circuit including at least one capacitor and at least one transistor that introduce a compensation zero in a transfer function of the LDO circuit that substantially tracks and compensates for a first non-dominant pole of the transfer function of the LDO circuit, the transfer function including a dominant pole having a location that is determined at least in-part by a value of the at least one capacitor in the compensation circuit; and
a dynamic biasing loop to sense current from a load coupled to the output stage transistor and to replicate a fraction of the current to supply one or both of the compensation circuit and the output stage transistor.

25. The LDO circuit of claim 24, wherein the dynamic biasing loop is configured to control movements of the dominant pole, the compensation zero, the first non-dominant pole and a second non-dominant pole of the transfer function such that the poles and the compensation zero move in a synchronized manner as the output current load changes to maintain a uniform stability profile.

26. The LDO circuit of claim 25, wherein the output current load changes in a range of tens of nA to tens of milliAmps.

27. The LDO circuit of claim 24, wherein the compensation circuit, together with the output stage transistor, is configured to introduce a Miller multiplication factor for the at least one capacitor in the feedback circuit.

28. The LDO circuit of claim 24, wherein a location of the first non-dominant pole is determined at least in-part by the value of the at least one capacitor in the compensation circuit.

* * * * *